(12) United States Patent
Steltz et al.

(10) Patent No.: US 10,459,063 B2
(45) Date of Patent: Oct. 29, 2019

(54) RANGING AND ANGLE OF ARRIVAL ANTENNA SYSTEM FOR A MOBILE ROBOT

(71) Applicant: iRobot Corporation, Bedford, MA (US)

(72) Inventors: Erik Steltz, Melrose, MA (US); Scott Lenser, Waltham, MA (US); Steven Shamlian, Burlington, MA (US); Brian Doughty, Framingham, MA (US); Heath Dube, Hollis, NH (US)

(73) Assignee: iRobot Corporation, Bedford, MA (US)

( * ) Notice: Subject to any disclaimer, the term of this patent is extended or adjusted under 35 U.S.C. 154(b) by 242 days.

(21) Appl. No.: 15/435,058

(22) Filed: Feb. 16, 2017

(65) Prior Publication Data

US 2017/0234961 A1    Aug. 17, 2017

Related U.S. Application Data

(60) Provisional application No. 62/295,832, filed on Feb. 16, 2016.

(51) Int. Cl.
*G01S 5/00* (2006.01)
*G01S 5/02* (2010.01)
(Continued)

(52) U.S. Cl.
CPC ............... *G01S 5/021* (2013.01); *G01S 1/68* (2013.01); *G01S 3/023* (2013.01); *G01S 3/48* (2013.01);
(Continued)

(58) Field of Classification Search
CPC ... G01S 5/021; G01S 5/10; G01S 5/12; G01S 1/68; G01S 3/023; G01S 3/48; H01Q 1/084; H01Q 3/08; H01Q 9/30; Y10S 901/01
See application file for complete search history.

(56) References Cited

U.S. PATENT DOCUMENTS 2,751,030 A    6/1956  Null
3,128,840 A    4/1964  Barrett
(Continued)

FOREIGN PATENT DOCUMENTS

DE    19932552    2/2000
EP      792726    9/1997
(Continued)

OTHER PUBLICATIONS

"Electrolux—Designed for the well-lived home (Welcome to the Electrolux Trilobite)," Retrieved from the Internet: URL<http://www.electroluxusa.com/node57.as[?currentURL=node142.asp%3F>. Accessed Mar. 2005, 2 pages.
(Continued)

*Primary Examiner* — Khai M Nguyen
(74) *Attorney, Agent, or Firm* — Fish & Richardson P.C.

(57) ABSTRACT

A mobile robot includes a chassis, a shell moveably mounted on the chassis, and a cutting assembly mounted to the chassis. The mobile robot also includes a communication system that includes an antenna module disposed on a rear portion of the mobile robot. The antenna module includes a base assembly, and an antenna assembly mounted to the base assembly by a spring. The antenna assembly includes a ranging antenna, and at least three angle antennas arranged axisymmetrically about the ranging antenna, such that the ranging antenna and the three angle antennas define a tetrahedral geometry for determining an angle of arrival for one or more incident signals.

20 Claims, 9 Drawing Sheets

(51) Int. Cl.
- *G01S 3/48* (2006.01)
- *G01S 3/02* (2006.01)
- *G01S 1/68* (2006.01)
- *G01S 5/10* (2006.01)
- *H01Q 1/08* (2006.01)
- *H01Q 3/08* (2006.01)
- *H01Q 9/30* (2006.01)
- *G01S 5/12* (2006.01)

(52) U.S. Cl.
CPC .................. *G01S 5/10* (2013.01); *G01S 5/12* (2013.01); *H01Q 1/084* (2013.01); *H01Q 3/08* (2013.01); *H01Q 9/30* (2013.01); *Y10S 901/01* (2013.01)

(56) References Cited

U.S. PATENT DOCUMENTS

| | | |
|---|---|---|
| 3,385,041 A | 5/1968 | Douglas |
| 3,457,575 A | 7/1969 | Bienek |
| 3,550,714 A | 12/1970 | Bellinger |
| 3,674,316 A | 7/1972 | De Brey |
| 3,924,389 A | 12/1975 | Kita |
| 3,937,174 A | 2/1976 | Haaga |
| 3,946,543 A | 3/1976 | Templeton |
| 4,119,900 A | 10/1978 | Kremnitz |
| 4,133,404 A | 1/1979 | Griffin |
| 4,163,977 A | 8/1979 | Polstorff |
| 4,306,329 A | 12/1981 | Yokoi |
| 4,328,545 A | 5/1982 | Halsall et al. |
| 4,369,543 A | 1/1983 | Chen et al. |
| 4,513,469 A | 4/1985 | Godfrey et al. |
| 4,545,453 A | 10/1985 | Yoshimura et al. |
| 4,556,313 A | 12/1985 | Miller et al. |
| 4,603,753 A | 8/1986 | Yoshimura et al. |
| 4,626,995 A | 12/1986 | Lofgren et al. |
| 4,674,048 A | 6/1987 | Okumura |
| 4,679,152 A | 7/1987 | Perdue |
| 4,696,074 A | 9/1987 | Cavalli et al. |
| 4,700,301 A | 10/1987 | Dyke |
| 4,700,427 A | 10/1987 | Knepper |
| 4,716,621 A | 1/1988 | Zoni |
| 4,733,431 A | 3/1988 | Martin |
| 4,756,049 A | 7/1988 | Uehara |
| 4,767,237 A | 8/1988 | Cosman et al. |
| 4,769,700 A | 9/1988 | Pryor |
| 4,777,416 A | 10/1988 | George, II et al. |
| 4,782,550 A | 11/1988 | Jacobs |
| 4,811,228 A | 3/1989 | Hyyppa |
| 4,854,000 A | 8/1989 | Takimoto |
| 4,887,415 A | 12/1989 | Martin |
| 4,893,025 A | 1/1990 | Lee |
| 4,909,024 A | 3/1990 | Jones et al. |
| 4,912,643 A | 3/1990 | Beirne |
| 4,918,441 A | 4/1990 | Bohman |
| 4,919,224 A | 4/1990 | Shyu et al. |
| 4,933,864 A | 6/1990 | Evans et al. |
| 4,962,453 A | 10/1990 | Pong et al. |
| 4,974,283 A | 12/1990 | Holsten et al. |
| 5,002,145 A | 3/1991 | Waqkaumi et al. |
| 5,017,415 A | 5/1991 | Cosman et al. |
| 5,086,535 A | 2/1992 | Grossmeyer et al. |
| 5,093,955 A | 3/1992 | Blehert et al. |
| 5,109,566 A | 5/1992 | Kobayashi et al. |
| 5,142,985 A | 9/1992 | Stearns et al. |
| 5,163,202 A | 11/1992 | Kawakami et al. |
| 5,163,273 A | 11/1992 | Wojtkowski et al. |
| 5,164,579 A | 11/1992 | Pryor et al. |
| 5,165,064 A | 11/1992 | Mattaboni |
| 5,204,814 A | 4/1993 | Noonan et al. |
| 5,208,521 A | 5/1993 | Aoyama |
| 5,216,777 A | 6/1993 | Moro et al. |
| 5,239,720 A | 8/1993 | Wood et al. |
| 5,261,139 A | 11/1993 | Lewis |
| 5,279,672 A | 1/1994 | Betker et al. |
| 5,284,522 A | 2/1994 | Kobayashi et al. |
| 5,293,955 A | 3/1994 | Lee |
| 5,303,448 A | 4/1994 | Hennessey et al. |
| 5,319,828 A | 6/1994 | Waldhauser et al. |
| 5,321,614 A | 6/1994 | Ashworth |
| 5,324,948 A | 6/1994 | Dudar et al. |
| 5,341,540 A | 8/1994 | Soupert et al. |
| 5,353,224 A | 10/1994 | Lee et al. |
| 5,369,347 A | 11/1994 | Yoo |
| 5,410,479 A | 4/1995 | Coker |
| 5,438,721 A | 8/1995 | Pahno et al. |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,455,982 A | 10/1995 | Armstrong et al. |
| 5,465,525 A | 11/1995 | Mifune et al. |
| 5,467,273 A | 11/1995 | Faibish et al. |
| 5,497,529 A | 3/1996 | Boesi |
| 5,507,067 A | 4/1996 | Hoekstra et al. |
| 5,515,572 A | 5/1996 | Hoekstra et al. |
| 5,528,888 A | 6/1996 | Miyamoto et al. |
| 5,534,762 A | 7/1996 | Kim |
| 5,537,017 A | 7/1996 | Feiten et al. |
| 5,539,953 A | 7/1996 | Kurz |
| 5,542,146 A | 8/1996 | Hoekstra et al. |
| 5,548,511 A | 8/1996 | Bancroft |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| 5,611,106 A | 3/1997 | Wulff |
| 5,611,108 A | 3/1997 | Knowlton et al. |
| 5,613,261 A | 3/1997 | Kawakami et al. |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,650,702 A | 7/1997 | Azumi |
| 5,652,489 A | 7/1997 | Kawakami |
| 5,682,213 A | 10/1997 | Schmutz |
| 5,682,313 A | 10/1997 | Edlund et al. |
| 5,682,839 A | 11/1997 | Grimsley et al. |
| 5,709,007 A | 1/1998 | Chiang |
| 5,761,762 A | 6/1998 | Kubo et al. |
| 5,781,960 A | 7/1998 | Kilstrom et al. |
| 5,786,602 A | 7/1998 | Pryor et al. |
| 5,787,545 A | 8/1998 | Colens |
| 5,794,297 A | 8/1998 | Muta |
| 5,812,267 A | 9/1998 | Everett, Jr. et al. |
| 5,819,008 A | 10/1998 | Asama et al. |
| 5,825,981 A | 10/1998 | Matsuda |
| 5,839,156 A | 11/1998 | Park et al. |
| 5,841,259 A | 11/1998 | Kim et al. |
| 5,867,800 A | 2/1999 | Leif |
| 5,916,111 A | 6/1999 | Colens |
| 5,926,909 A | 7/1999 | McGee |
| 5,935,179 A | 8/1999 | Kleiner et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,959,423 A | 9/1999 | Nakanishi et al. |
| 5,974,348 A | 10/1999 | Rocks |
| 6,009,358 A | 12/1999 | Angott et al. |
| 6,041,471 A | 3/2000 | Charkey et al. |
| 6,049,745 A | 4/2000 | Douglas et al. |
| 6,073,427 A | 6/2000 | Nichols |
| 6,076,025 A | 6/2000 | Ueno et al. |
| 6,076,227 A | 6/2000 | Schalig et al. |
| 6,108,067 A | 8/2000 | Hanseder |
| 6,108,076 A | 8/2000 | Hanseder |
| 6,112,143 A | 8/2000 | Allen et al. |
| 6,124,694 A | 9/2000 | Bancroft et al. |
| 6,133,730 A | 10/2000 | Winn |
| 6,140,146 A | 10/2000 | Brady et al. |
| 6,166,706 A | 12/2000 | Gallagher et al. |
| 6,226,830 B1 | 5/2001 | Hendriks et al. |

(56) References Cited

U.S. PATENT DOCUMENTS

| | | |
|---|---|---|
| 6,240,342 B1 | 5/2001 | Fiegert et al. |
| 6,255,793 B1 | 7/2001 | Peless et al. |
| 6,259,979 B1 | 7/2001 | Holmquist |
| D451,931 S | 9/2001 | Peless et al. |
| 6,285,930 B1 | 9/2001 | Dickson et al. |
| 6,300,737 B1 | 10/2001 | Begvall et al. |
| 6,339,735 B1 | 1/2002 | Peless et al. |
| 6,374,155 B1 | 4/2002 | Wallach et al. |
| 6,385,515 B1 | 5/2002 | Dickson et al. |
| 6,408,226 B1 | 6/2002 | Byrne et al. |
| 6,417,641 B2 | 7/2002 | Peless et al. |
| 6,438,456 B1 | 8/2002 | Feddema et al. |
| 6,442,476 B1 | 8/2002 | Poropat |
| 6,443,509 B1 | 9/2002 | Levin et al. |
| 6,444,003 B1 | 9/2002 | Sutcliffe |
| 6,463,368 B1 | 10/2002 | Feiten et al. |
| 6,465,982 B1 | 10/2002 | Bergvall et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,507,773 B2 | 1/2003 | Parker et al. |
| 6,525,509 B1 | 2/2003 | Petersson et al. |
| 6,532,404 B2 | 3/2003 | Colens |
| 6,535,793 B2 | 3/2003 | Allard |
| 6,548,982 B1 | 4/2003 | Papanikolopoulos et al. |
| 6,571,415 B2 | 6/2003 | Gerber et al. |
| 6,574,536 B1 | 6/2003 | Kawagoe et al. |
| 6,580,246 B2 | 6/2003 | Jacobs |
| 6,580,978 B1 | 6/2003 | McTamaney |
| 6,584,376 B1 | 6/2003 | Kommer |
| 6,586,908 B2 | 7/2003 | Petersson et al. |
| 6,594,844 B2 | 7/2003 | Jones |
| 6,604,022 B2 | 8/2003 | Parker |
| 6,605,156 B1 | 8/2003 | Clark et al. |
| 6,611,120 B2 | 8/2003 | Song et al. |
| 6,611,734 B2 | 8/2003 | Parker et al. |
| 6,611,738 B2 | 8/2003 | Raffner |
| 6,615,108 B1 | 9/2003 | Peless et al. |
| 6,658,693 B1 | 12/2003 | Reed, Jr. |
| 6,661,239 B1 | 12/2003 | Ozik |
| 6,671,592 B1 | 12/2003 | Bisset et al. |
| 6,690,134 B1 | 2/2004 | Jones et al. |
| 6,741,054 B2 | 5/2004 | Koselka et al. |
| 6,748,297 B2 | 6/2004 | Song et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,830,120 B1 | 12/2004 | Yashima et al. |
| 6,841,963 B2 | 1/2005 | Song et al. |
| 6,845,297 B2 | 1/2005 | Allard |
| 6,901,624 B2 | 1/2005 | Mori et al. |
| 6,938,298 B2 | 1/2005 | Turbjom |
| 6,971,140 B2 | 1/2005 | Kim |
| 6,850,024 B2 | 2/2005 | Peless et al. |
| 6,870,792 B2 | 3/2005 | Chiappetta |
| 6,883,201 B2 | 4/2005 | Jones et al. |
| 6,885,912 B2 | 4/2005 | Peless et al. |
| D510,066 S | 9/2005 | Hickey et al. |
| 6,940,291 B1 | 9/2005 | Ozik |
| 6,956,348 B2 | 10/2005 | Landry et al. |
| 6,984,952 B2 | 1/2006 | Peless et al. |
| 6,999,850 B2 | 2/2006 | McDonald |
| 7,024,278 B2 | 4/2006 | Chiapetta et al. |
| 7,069,124 B1 | 6/2006 | Whittaker et al. |
| 7,085,624 B2 | 8/2006 | Aldred et al. |
| 7,155,309 B2 | 12/2006 | Peless et al. |
| 7,203,576 B1 | 4/2007 | Wilson et al. |
| 7,206,677 B2 | 4/2007 | Hulden |
| D559,867 S | 1/2008 | Abramson |
| 7,349,759 B2 | 3/2008 | Peless et al. |
| D573,610 S | 7/2008 | Abramson |
| 7,441,392 B2 | 10/2008 | Lilliestielke |
| 7,481,036 B2 | 1/2009 | Lilliestielke et al. |
| 7,525,287 B2 | 4/2009 | Miyashita et al. |
| 7,729,801 B2 | 6/2010 | Abramson |
| 8,046,103 B2 | 10/2011 | Abramson et al. |
| 8,069,639 B2 | 12/2011 | Fancher, III |
| D652,431 S | 1/2012 | Naslund |
| D656,163 S | 3/2012 | Johansson et al. |
| 8,136,333 B1 | 3/2012 | Levin et al. |
| 8,306,659 B2 | 11/2012 | Abramson et al. |
| 8,413,616 B2 | 4/2013 | Bergquist |
| 8,532,822 B2 | 9/2013 | Abramson et al. |
| 8,634,960 B2 | 1/2014 | Sandin et al. |
| 8,635,841 B2 | 1/2014 | Fiser et al. |
| 8,781,627 B2 | 7/2014 | Sandin et al. |
| 8,868,237 B2 | 10/2014 | Sandin et al. |
| 8,954,193 B2 | 2/2015 | Sandin et al. |
| 9,043,952 B2 | 6/2015 | Sandin et al. |
| 9,043,953 B2 | 6/2015 | Sandin et al. |
| 9,471,063 B2 | 10/2016 | Ouyang |
| 2001/0047231 A1 | 11/2001 | Peless et al. |
| 2002/0016649 A1 | 2/2002 | Jones |
| 2002/0049517 A1* | 4/2002 | Ruffner .............. A01D 34/008 |
| | | 701/1 |
| 2002/0120364 A1 | 8/2002 | Colens |
| 2002/0140393 A1 | 10/2002 | Peless et al. |
| 2002/0156556 A1 | 10/2002 | Ruffner |
| 2002/0160845 A1 | 10/2002 | Simonsen |
| 2002/0011813 A1 | 11/2002 | Koselka et al. |
| 2002/0173877 A1 | 11/2002 | Zweig |
| 2003/0019071 A1 | 1/2003 | Field et al. |
| 2003/0023356 A1 | 1/2003 | Keable |
| 2003/0025472 A1 | 2/2003 | Jones et al. |
| 2003/0055337 A1 | 3/2003 | Lin |
| 2003/0060928 A1 | 3/2003 | Abramson et al. |
| 2003/0120389 A1 | 6/2003 | Abramson et al. |
| 2003/0137268 A1 | 7/2003 | Papanikolopoulos et al. |
| 2003/0182914 A1 | 10/2003 | Shibata et al. |
| 2003/0192144 A1 | 10/2003 | Song et al. |
| 2003/0208304 A1 | 11/2003 | Peless et al. |
| 2003/0216834 A1 | 11/2003 | Allard |
| 2003/0233177 A1 | 12/2003 | Johnson et al. |
| 2003/0234325 A1 | 12/2003 | Marino et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030571 A1 | 2/2004 | Solomon |
| 2004/0031113 A1 | 2/2004 | Wosewick et al. |
| 2004/0036618 A1 | 2/2004 | Ku et al. |
| 2004/0049877 A1 | 3/2004 | Jones et al. |
| 2004/0068351 A1 | 4/2004 | Solomon |
| 2004/0068415 A1 | 4/2004 | Solomon |
| 2004/0068416 A1 | 4/2004 | Solomon |
| 2004/0076324 A1 | 4/2004 | Burl et al. |
| 2004/0088079 A1 | 5/2004 | Lavarec et al. |
| 2004/0111184 A1 | 6/2004 | Chiappetta et al. |
| 2004/0111196 A1 | 6/2004 | Dean |
| 2004/0134336 A1 | 7/2004 | Solomon |
| 2004/0134337 A1 | 7/2004 | Solomon |
| 2004/0156541 A1 | 8/2004 | Jeon et al. |
| 2004/0158357 A1 | 8/2004 | Lee et al. |
| 2004/0187457 A1 | 9/2004 | Colens |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0220000 A1 | 11/2004 | Falone |
| 2004/0236468 A1 | 11/2004 | Taylor et al. |
| 2004/0244138 A1 | 12/2004 | Taylor et al. |
| 2005/0000543 A1 | 1/2005 | Taylor et al. |
| 2005/0007057 A1 | 1/2005 | Peless et al. |
| 2005/0010331 A1 | 1/2005 | Taylor et al. |
| 2005/0020374 A1 | 1/2005 | Wang |
| 2005/0097952 A1 | 5/2005 | Steph |
| 2005/0108999 A1 | 5/2005 | Bucher |
| 2005/0113990 A1 | 5/2005 | Peless et al. |
| 2005/0156562 A1 | 7/2005 | Cohen et al. |
| 2005/0204717 A1 | 9/2005 | Colens |
| 2005/0251292 A1 | 11/2005 | Casey et al. |
| 2005/0259017 A1* | 11/2005 | Yegin .................. H01Q 1/3275 |
| | | 343/728 |
| 2005/0278094 A1 | 12/2005 | Swinbanks et al. |
| 2005/0287038 A1 | 12/2005 | Dubrovsky et al. |

(56) References Cited

U.S. PATENT DOCUMENTS

| | | | |
|---|---|---|---|
| 2006/0293794 | A1 | 12/2006 | Harwig et al. |
| 2007/0016328 | A1 | 1/2007 | Ziegler et al. |
| 2007/0142964 | A1 | 6/2007 | Abramson |
| 2007/0150109 | A1 | 6/2007 | Peless et al. |
| 2007/0276590 | A1 | 11/2007 | Lenard |
| 2008/0039974 | A1 | 2/2008 | Sandin et al. |
| 2008/0097645 | A1 | 4/2008 | Abramson et al. |
| 2008/0167753 | A1 | 7/2008 | Peless et al. |
| 2008/0183349 | A1 | 7/2008 | Abramson et al. |
| 2009/0254218 | A1 | 10/2009 | Sandin et al. |
| 2010/0059000 | A1 | 3/2010 | Bergquist |
| 2010/0102525 | A1 | 4/2010 | Fancher |
| 2011/0130875 | A1 | 6/2011 | Abramson |
| 2011/0234153 | A1 | 9/2011 | Abramson |
| 2012/0041594 | A1 | 2/2012 | Abramson et al. |
| 2012/0226381 | A1 | 9/2012 | Abramson et al. |
| 2012/0258741 | A1 | 10/2012 | Tillson |
| 2012/0290165 | A1 | 11/2012 | Ouyang |
| 2013/0006419 | A1 | 1/2013 | Bergstrom et al. |
| 2013/0030609 | A1 | 1/2013 | Jagenstedt |
| 2013/0066484 | A1 | 3/2013 | Markusson et al. |
| 2013/0069835 | A1* | 3/2013 | Swais ............... H01Q 1/3275 343/715 |
| 2013/0076304 | A1 | 3/2013 | Andersson et al. |
| 2013/0110322 | A1 | 5/2013 | Jagenstedt et al. |
| 2013/0152538 | A1 | 6/2013 | Fiser et al. |
| 2013/0184924 | A1 | 7/2013 | Jagenstedt et al. |
| 2013/0249179 | A1 | 9/2013 | Burns |
| 2013/0253701 | A1 | 9/2013 | Halloran |
| 2013/0261867 | A1 | 10/2013 | Burnett et al. |
| 2013/0274920 | A1 | 10/2013 | Abramson et al. |
| 2014/0102061 | A1 | 4/2014 | Sandin et al. |
| 2014/0102062 | A1 | 4/2014 | Sandin et al. |
| 2014/0117892 | A1 | 5/2014 | Coates |
| 2014/0249571 | A1 | 9/2014 | Halloran et al. |
| 2015/0006015 | A1 | 1/2015 | Sandin et al. |
| 2015/0289111 | A1 | 10/2015 | Ozkan |
| 2016/0065719 | A1 | 3/2016 | Jeong |
| 2017/0085293 | A1 | 3/2017 | Marrow et al. |
| 2017/0212205 | A1* | 7/2017 | Bialer ................... G01S 3/48 |
| 2017/0234961 | A1 | 8/2017 | Steltz et al. |
| 2019/0195981 | A1* | 6/2019 | Ding ..................... G01S 1/02 |

FOREIGN PATENT DOCUMENTS

| | | |
|---|---|---|
| EP | 774702 | 10/2001 |
| EP | 1331537 | 7/2003 |
| EP | 1704766 | 9/2006 |
| EP | 2946650 | 11/2015 |
| FR | 2828589 | 2/2003 |
| GB | 2142447 | 1/1985 |
| GB | 2283838 | 5/1995 |
| GB | 2344745 | 6/2000 |
| GB | 2382157 | 5/2003 |
| JP | 62120510 | 6/1987 |
| JP | 62154008 | 7/1987 |
| JP | 63183032 | 7/1988 |
| JP | 63241610 | 10/1988 |
| JP | 26312 | 1/1990 |
| JP | 3051023 | 3/1991 |
| JP | 4320612 | 11/1992 |
| JP | 6327598 | 11/1994 |
| JP | 7129239 | 5/1995 |
| JP | 7295636 | 11/1995 |
| JP | 8016776 | 1/1996 |
| JP | 8089451 | 4/1996 |
| JP | 8152916 | 6/1996 |
| JP | 9179625 | 7/1997 |
| JP | 9185410 | 7/1997 |
| JP | 11508810 | 8/1999 |
| JP | 11510935 | 9/1999 |
| JP | 2001258807 | 9/2001 |
| JP | 2001275908 | 10/2001 |
| JP | 2001525567 | 12/2001 |
| JP | 2002078650 | 3/2002 |
| JP | 2002204768 | 7/2002 |
| JP | 3356170 | 10/2002 |
| JP | 2002532178 | 10/2002 |
| JP | 3375843 | 11/2002 |
| JP | 2002323925 | 11/2002 |
| JP | 2002355206 | 12/2002 |
| JP | 2002360471 | 12/2002 |
| JP | 2002360482 | 12/2002 |
| JP | 2003005296 | 1/2003 |
| JP | 2003010076 | 1/2003 |
| JP | 2003036116 | 2/2003 |
| JP | 2003038401 | 2/2003 |
| JP | 2003038402 | 2/2003 |
| JP | 2003505127 | 2/2003 |
| JP | 2003061882 | 3/2003 |
| JP | 2003310489 | 11/2003 |
| WO | 1995026512 | 10/1995 |
| WO | 1997040734 | 11/1997 |
| WO | 1997041451 | 11/1997 |
| WO | 1998053456 | 11/1998 |
| WO | 1999016078 | 4/1999 |
| WO | 1999028800 | 6/1999 |
| WO | 1999038056 | 7/1999 |
| WO | 1999038237 | 7/1999 |
| WO | 1999059042 | 11/1999 |
| WO | 2000036962 | 6/2000 |
| WO | 2000038026 | 6/2000 |
| WO | 2000038029 | 6/2000 |
| WO | 2000004430 | 10/2000 |
| WO | 2000078410 | 12/2000 |
| WO | 2001006904 | 2/2001 |
| WO | 2001006905 | 2/2001 |
| WO | 2002039864 | 5/2002 |
| WO | 2002039868 | 5/2002 |
| WO | 2002058527 | 8/2002 |
| WO | 2002062194 | 8/2002 |
| WO | 2002067744 | 9/2002 |
| WO | 2002067745 | 9/2002 |
| WO | 2002074150 | 9/2002 |
| WO | 2002075356 | 9/2002 |
| WO | 2002075469 | 9/2002 |
| WO | 2002075470 | 9/2002 |
| WO | 2002101477 | 12/2002 |
| WO | 2003026474 | 4/2003 |
| WO | 2003040845 | 5/2003 |
| WO | 2003040846 | 5/2003 |
| WO | 2003065140 | 8/2003 |
| WO | 2004004533 | 1/2004 |
| WO | 2004006034 | 1/2004 |
| WO | 2004058028 | 1/2004 |
| WO | 2005077244 | 1/2004 |
| WO | 2005055795 | 6/2005 |
| WO | 2006068403 | 6/2006 |
| WO | 2015051821 | 4/2015 |

OTHER PUBLICATIONS

"EVac Robotic Vacuum," S1727 Instruction Manual, Sharper Image Corp, Copyright 2004, 13 pages.

"Put Your Roomba . . . On, Automatic" webpages: http://www.acomputeredge.com/roomba, accessed Apr. 2005, 3 pages.

"Zoombot Remote Controlled Vaccuum-RV-500 NEW Roomba 2," eBay website: http://cgi.ebay.com/ws/eBayISAPI.dll?ViewItem&category=43526&item=4373497618&rd=1, accessed Apr. 2005, 7 pages.

Angle et al., U.S. Appl. No. 60/177,703, filed Jan. 24, 2000, available at http://portal.uspto.gov/external/portal/pair , accessed Jul. 11, 2012, 16 pages.

Bohn et al. "Super-distributed RFID Tag Infrastructures," Lecture Notes in Computer Science, Springer Verlag, Berlin, DE, vol. 3295, Nov. 11, 2004, pp. 1-12.

Campbell et al., U.S. Appl. No. 60/741,442, filed Dec. 2, 2005, available at http://patentscope.wipo.int/search/docservicepdf_pct/id00000005206306.pdf, accessed Jul. 11, 2012, 130 pages.

Caracciolo et al., "Trajectory Tracking Control of a Four-Wheel Differentially Driven Mobile Robot," IEEE Int. Conf. Robotics and Automation, Detroit, MI, 1999, pp. 2632-2638.

(56) References Cited

OTHER PUBLICATIONS

Casey et al., U.S. Appl. No. 60/582,992, filed Jun. 25, 2004, available at http://portal.uspto.gov/external/portal/pair, accessed Jul. 11, 2012, 24 pages.
Domnitcheva "Smart Vacuum Cleaner—An Autonomous Location-Aware Cleaning Device," Proceedings of the International Conference on Ubiquitous Computing, Sep. 10, 2004, pp. 1-2.
Doty and Harrison, "Sweep Strategies for a Sensory-Driven, Behavior-Based Vacuum Cleaning Agent," AAAI 1993 Fall Symposium Series, Instantiating Real-World Agents, Oct. 22-24, 1993, pp. 1-6.
Everyday Robots, "Everyday Robots: Reviews, Discussion and News for Consumers," Aug. 2004, Retrieved from the Internet: URL<www.everydayrobots.com/index.php?option=content&task=view&id=9>, retrieved Sep. 2012, 4 pages.
Evolution Robotics, "NorthStar-Low-cost Indoor Localization—How it Works," E Evolution Robotics, 2005, 2 pages.
*Facts on Trilobite*, webpage, Retrieved from the Internet: URL<http://trilobiteelectroluxse/presskit_en/model11335asp?print=yes&pressID=>, accessed Dec. 2003, 2 pages.
Final Office Action issued in U.S. Appl. No. 11/688,225, dated Nov. 10, 2011, 45 pages.
Gat, "Robust Low-Computation Sensor-driven Control for Task-Directed Navigation," Proc of IEEE International Conference on Robotics and Automation, Sacramento, CA, Apr. 1991, pp. 2484-2489.
*Hicks and Hall, "A Survey of Robot Lawn Mowers"*, http://www.robotics.uc.edu/papers/paper2000/lawnmower.pdf, 2000, 8 pages.
*Hitachi: News release: "The home cleaning robot of the autonomous movement type (experimental machine) is developed,"* May 29, 2003, Retrieved from the Internet: URL<www.i4u.com./japanreleases/hitachirobot.htm>, retrieved Mar. 2005, 5 pages.
International Preliminary Report on Patentability dated Sep. 23, 2008 from International Application No. PCT/US2007/064326, dated Sep. 23, 2008, 10 pages.
International Preliminary Report on Patentability issued in International Application No. PCT/US2007/064323, dated Sep. 23, 2008, 10 pages.
International Search Report and Written Opinion in International Application No. PCT/US2015/050775, dated Dec. 23, 2015, 12 pages.
International Search Report and Written Opinion issued in PCT/US2007/064323, dated Jun. 16, 2008, 14 pages.
International Search Report and Written Opinion issued in PCT/US2007/064326, dated Jul. 17, 2008, 6 pages.
International Search Report and Written Opinion issued in PCT/US2016/043541, dated Oct. 7, 2016, 8 pages.
Invitation to Pay Additional Fees issued in International Application No. PCT/US2007/064326, dated Apr. 18, 2008, 9 pages.
*Kahney, "Wired News: Robot Vacs are in the House,"* Jun. 2003, Retrieved from the Internet: URLwww.wired.com/news/technology/o.1282.59237.00.html, accessed Mar. 2005, 5 pages.
Karcher "Karcher RoboCleaner RC 3000," Retrieved from the Internet: URL<www.robocleaner.de/english/screen3.html>. 4 pages, Dec. 2003.
Karcher USA, "RC3000 Robotic Cleaner," 2005, Retrieved from the Internet: URL http://www.karcher-usa.com/showproducts.php?op=view prod¶m1=143&param2=&param3=, accessed Mar. 2005, 3 pages.
Karcher, "Product Manual Download 'Karch'," available at www.karcher.com, 2004, 16 pages.
Karcher, RC 3000 Cleaning Robot-User Manual Manufacturer: Alfred-Karcher GmbH & Co, Cleaning Systems, Alfred Karcher-Str 28-40, PO Box 160, D-71349 Winnenden, Germany, Dec. 2002, 8 pages.
Kimura et al., "Stuck Evasion Control for Active Wheel Passive-Joint Snake-like Mobile Robot 'Genbu'," Proceedings of the 2004 IEEE International Conference on Robotics 8 Automation, New Orleans, LA, Apr. 2004, 6 pages.
KOOLVAC Robotic Vacuum Cleaner Owner's Manual, Koolatron, 2004, 13 pages.
Kozlowski and Pazderski, "Modeling and Control of a 4-wheel Skid-steering Mobile Robot," International J. of Applied Mathematics and Computer Science, 2004, 14(4):477-496.
Kubitz et al., "Application of radio frequency identification devices to support navigation of autonomous mobile robots" Vehicular Technology Conference, vol. 1, May 4, 1997, pp. 126-130.
Matthies et al., "Detecting Water Hazards for Autonomous Off-Road Navigation," Proceedings of SPIE Conference 5083. Unmanned Ground Vehicle Technology V, Orlando, FL, Apr. 2003, pp. 231-242.
Morland,"Autonomous Lawnmower Control," Downloaded from the internet at: http://cns.bu.edu/~cjmorlan/robotics/lawnmower/report.pdf, Jul. 2002, 10 pages.
Non-final Office Action issued in U.S. Appl. No. 11/688,213, dated Jan. 27, 2011, 27 pages.
Non-final Office Action issued in U.S. Appl. No. 11/688,225, dated Feb. 24, 2011, 30 pages.
Non-final Office Action issued in U.S. Appl. No. 12/488,094, dated Jan. 26, 2011, 25 pages.
Non-final Office Action issued in U.S. Appl. No. 12/488,094, dated Jul. 28, 2011, 13 pages.
*On Robo, "Robot Reviews Samsung Robot Vacuum (VC-RP30W),"* 2005, Retrieved from the Internet: URL www.onrobo.com/reviews/AT_Home/vacuum_cleaners/on00vcrb30rosam/index.htm, accessed Mar. 2005, 2 pages.
*RoboMaid Sweeps Your Floors So You Won't Have to*, the Official Site, Retrieved from the Internet: URLhttp://therobomaid.com/, accessed Mar. 2005, 2 pages.
Robotic Vacuum Cleaner-Blue, Retrieved from the Internet: URL http://www.sharperimage.com/us/en/catalog/productview.jhtml?sku=S1727BLU, accessed Mar. 2005, 2 pages.
Schofield, "Neither Master nor Slave—A Practical Study in the Development and Employment of Cleaning Robots, Emerging Technologies and Factory Automation," 1999 Proceedings ETFA '99 1999 7th IEEE International Conference on Barcelona, Spain, Oct. 1999, pp. 1427-1434.
TheRobotStore.com, "Friendly Robotics Robotic Vacuum RV400—The Robot Store," www.therobotstore.com/s.nl/sc.9/category.-109/it.A/id.43/.f, accessed Apr. 2005, 1 page.
Thrun, "Learning Occupancy Grid Maps With Forward Sensor Models," Autonomous Robots 15, Sep. 1, 2003, 28 pages.
Wigley, "The Electric Lawn", in *The American Lawn*, Princeton Architectural Press New York with Canadian Centre for Architecture Montreal, 1999, pp. 155-195.

\* cited by examiner

RANGING AND ANGLE OF ARRIVAL ANTENNA SYSTEM FOR A MOBILE ROBOT

CLAIM OF PRIORITY

This application claims priority under 35 USC § 119(e) to U.S. Patent Application Ser. No. 62/295,832, filed on Feb. 16, 2016 the entire contents of which are hereby incorporated by reference.

TECHNICAL FIELD

This specification relates generally to a ranging and angle of arrival (AOA) antenna system for a mobile robot.

BACKGROUND

A mobile lawn-mowing robot can navigate about an environment to mow a confined area in that environment. The robot can determine its location within the environment by detecting beacons within the environment. The beacons can be passive beacons that reflect signals emitted by the robot or active beacons that emit signals detected by the robot. The robot can use these signals from the beacons to restrict its movement to a confined area within the environment and/or to enable systematic coverage of the lawn area.

SUMMARY

In one aspect, a mobile robot includes a chassis, a shell moveably mounted on the chassis, and a cutting assembly mounted to the chassis. The mobile robot also includes a communication system that includes an antenna module disposed on a rear portion of the mobile robot. The antenna module includes a base assembly, and an antenna assembly mounted to the base assembly by a spring. The antenna assembly includes a ranging antenna, and at least three angle antennas arranged axisymmetrically about the ranging antenna, such that the ranging antenna and the three angle antennas define a tetrahedral geometry for determining an angle of arrival for one or more incident signals.

In another aspect, a system includes a network of devices, and a mobile robot. The mobile robot includes a chassis, a shell moveably mounted on the chassis, and a cutting assembly mounted to the chassis. The mobile robot also includes a communication system that includes an antenna module disposed on a rear portion of the mobile robot. The antenna module includes a base assembly and an antenna assembly mounted to the base assembly by a spring. The antenna assembly includes a ranging antenna, and at least three angle antennas arranged axisymmetrically about the ranging antenna, such that the ranging antenna and the three angle antennas define a tetrahedral geometry for determining an angle of arrival for one or more incident signals.

In another aspect, a method for computing one or more calibration parameters associated with a pair of antennas disposed on a mobile robot includes receiving, by each of the pair of antennas for each of a plurality of locations of the pair of antennas relative to a transmitter, a wireless signal generated by the transmitter. The method also includes determining a phase difference of arrival (PDOA) of the wireless signal between the two antennas for each of the plurality of locations to obtain a set of PDOA values, and computing the one or more calibration parameters based on the set of PDOA values.

In some implementations, each pair of two of the angle antennas may be separated by less than one half wavelength of the one or more incident signals.

In some implementations, the ranging antenna and each of the at least three angle antenna may be separated by less than one half wavelength of the one or more incident signals.

In some implementations, the top of the antenna assembly may be positioned at a height of at least 400 mm.

In some implementations, the spring may be preloaded.

In some implementations, the incident signals may have a frequency between 5925 MHz and 7250 MHz.

In some implementations, the network of devices may include at least one of a beacon, a set of beacons, a server, and a user device.

In some implementations, the plurality of locations of the pair of antenna may include locations at different azimuth angles with respect to the transmitter.

In some implementations, the one or more calibration parameters may include a PDOA offset that is computed as a mean of the set of PDOA values.

In some implementations, the one or more calibration parameters may include a distance offset between the two antennas in the pair along a plane on which the antennas are disposed. The distance offset may be computed based on an amplitude of a function that represents the set of PDOA values.

In some implementations, the one or more calibration parameters may include an angle offset between the two antennas in the pair along a plane on which the antennas are disposed. The angle offset may be computed based on a phase of a function that represents the set of PDOA values.

In some implementations, the plurality of locations of the one of the antenna in the pair of antenna may include locations at different elevation angles with respect to the transmitter.

In some implementations, the one or more calibration parameters may include a vertical offset between the two antennas in the pair along a direction perpendicular to the plane on which the antennas are disposed.

In some implementations, the method may include adjusting the one or more calibration parameters to account for distortions introduced in the wireless signal by a channel between the transmitter and the pair of antennas.

In some implementations, adjusting the one or more calibration parameters may include accessing, a set of pre-computed correction parameters associated with the one or more calibration parameters, and adjusting the one or more calibration parameters using the corresponding correction parameters.

In some implementations, adjusting the one or more calibration parameters may include accessing, a set of pre-computed correction parameters associated with the set of PDOA values, adjusting the set of PDOA values using the corresponding correction parameters, and computing the one or more calibration parameters based on the adjusted set of PDOA values.

In some implementations, the angle of arrival may be calibrated using parameters determined from the ranging antenna and the three angle antennas.

Advantages of the foregoing may include, but are not limited to, the following. An antenna module is mounted to the rear portion of a mobile lawn-mowing robot to assist with determining ranging information and angle of arrival information from one or more beacons that are paired with the robot. By employing multiple antenna elements within the module, substantial real estate on the mobile robot is not needed to collect signals for determining the range and angle of arrival information. Further, calibration techniques are employable to improve the accuracy of the ranging and angle of arrival information. For example, calibration techniques can be used to account for the positions of the antenna element being offset within the antenna module. Techniques can also account for signal distortion, for example, caused by structural components of the mobile robot, the signaling environment, etc.

Any two or more of the features described in this specification, including in this summary section, can be combined to form implementations not specifically described herein.

The mobile lawn mowing robots, antenna modules, etc. or operational aspects thereof, described herein can include, or be controlled by, one or more computer program products that includes instructions that are stored on one or more non-transitory machine-readable storage media, and that are executable on one or more processing devices to control (e.g., to coordinate) the operations described herein. The mobile lawn mowing robots, or operational aspects thereof, described herein can be implemented as part of a system or method that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

FIG. 8 is an isometric view of antenna assembly components.

FIG. 9 is an exploded isometric view of the antenna assembly components of

FIG. 8.

Like reference numerals in different figures indicate like elements.

DETAILED DESCRIPTION

Described herein are example mobile lawn-mowing robots (hereinafter also referred to as robots) configured to traverse mowable surfaces, such as lawns, fields, and other mowable areas, to perform various mowing operations including, but not limited to, cutting grass. Also described herein are beacons that can communicate with the robots to enable navigation of the robots about the lawns. In some examples, a beacon can be exclusively paired to one or more robots such that only a robot paired with the beacon can localize to the beacon. Such robot and beacon pairings can be achieved, for example, by using techniques described in U.S. patent application Ser. No. 14/807,485, entitled "Pairing a Beacon with a Mobile Robot" which are incorporated by reference herein in its entirety. After pairing the robots with corresponding beacon sets, the robots can navigate using wideband, ultra-wideband, etc. signals emitted by the paired beacons. Communication operations between the robots and other devices, including beacons, are further described herein.

Figure 1A:
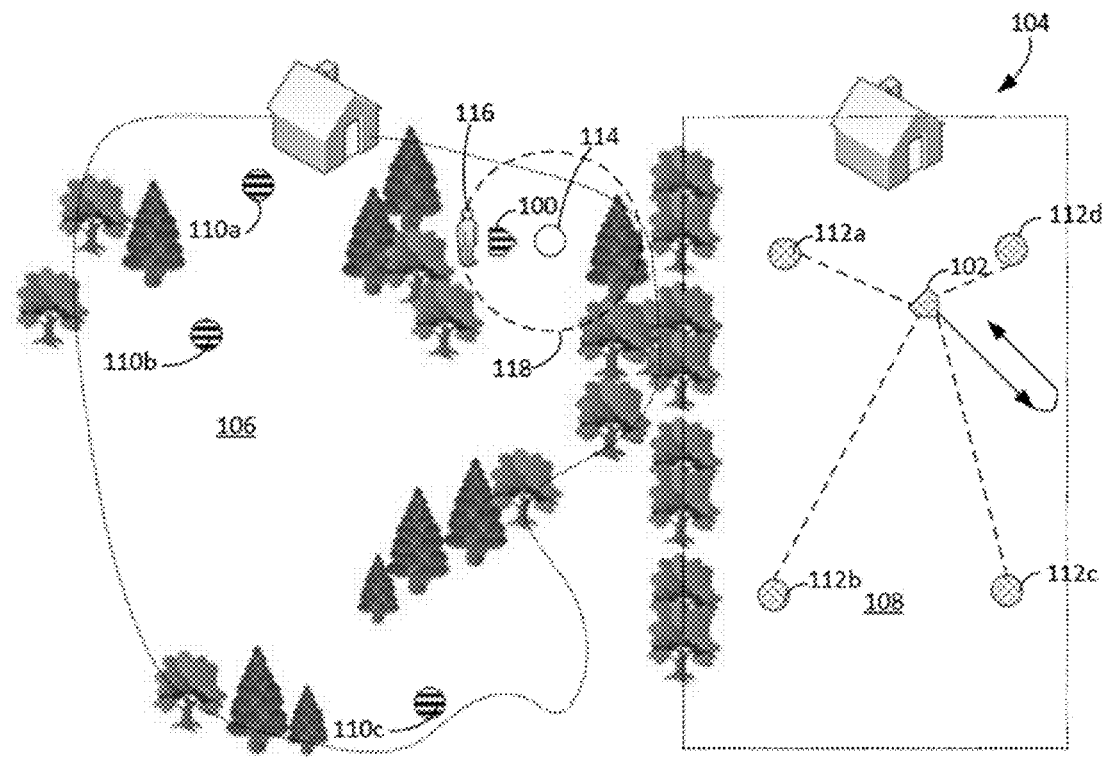
FIG. 1A illustrates a first mobile lawn mowing robot and first beacons located in a first lawn and a second mobile lawn mowing robot and second beacons located in a second lawn.

FIG. 1A shows an environment 104 that includes a first lawn 106 and a second lawn 108. First mobile lawn mowing robot 100 (referred to as first robot 100) is configured to execute mowing operations while navigating around lawn 106. Second mobile lawn mowing robot 102 (referred to as second robot 102) is configured to execute mowing operations while navigating around lawn 108. Robots 100, 102 each includes a control system, which can include one or more processing devices or controllers that are programmed to control robot operation. Each robot's control system is programmed, for example, to pair the robot 100, 102 to a corresponding set of beacons. For example, robot 100 is paired to beacons 110a, 110b, and 110c (beacons 110) on first lawn 106, and robot 102 is paired to beacons 112a, 112b, 112c, and 112d (beacons 112) on second lawn 108. Beacons 110, 112 each also includes a control system, which can include one or more processing devices or controllers programmed to control operation of the beacon, including operations to communicate with and pair with robots 100, 102.

In this regard, pairing includes establishing a relationship between a robot and its paired beacons so that the robot recognizes, for navigation and localization, signals from the paired beacons only, and not signals from other beacons to which the robot is not paired. After the user trains the robot to use signals emitted from its paired beacons to recognize a boundary of its lawn, the robot can use the signals from its paired beacons to identify the boundary as the robot navigates around the lawn automatically (e.g., without user input).

For example, as shown in FIG. 1A, robot 100 uses beacons 110 to identify the boundary of its lawn 106, and robot 102 uses beacons 112 to identify the boundary of its lawn 108. Information about a lawn boundary is determined during a perimeter teaching operation that a user facilitates. The information is stored in memory in the robot. Together with the beacon signals, the information allows the robot to navigate around the lawn automatically, while not crossing the lawn boundary.

Because different robots are paired to different sets of beacons, signals from unpaired beacons will not influence robot operation. In some implementations, signals transmitted between a robot and its paired beacons include wideband, ultra-wideband, etc. signals. Wideband signals may include radio frequency signals having a frequency between 5925 and 7250 MHz. The ultra-wideband signals may include radio frequency signals having a bandwidth that exceeds 500 MHz, and an operating frequency between 3.1 GHz and 10.6 GHz.

Figure 1B:
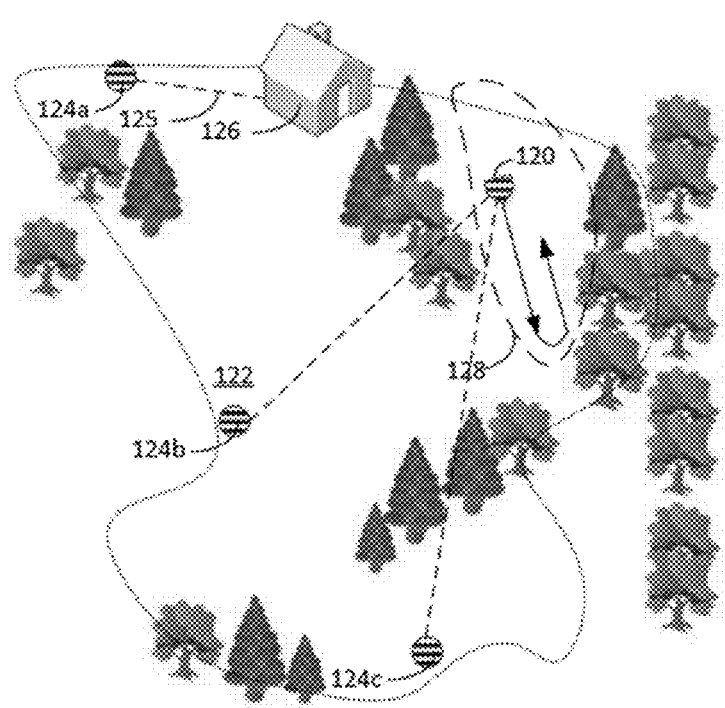
FIG. 1B illustrates a mobile robot and beacons located in a lawn.

In some situations, the user may need to replace a beacon in the set of beacons or to add a beacon to the set of beacons already assigned to the system. During mowing operations, the robot uses signals from beacons to accurately estimate its location within the lawn. The user may need to replace a beacon if the beacon becomes damaged or otherwise unusable to ensure that the robot can detect a sufficient number of signals from the beacons during its mowing operations. In some cases, the user may need to add a beacon to the set of beacons placed on the lawn. For example, as shown in FIG. 1B, during navigation, robot 120 may navigate about a lawn 122 using beacons 124a, 124b, 124c paired to the robot 120. When robot 120 enters portion 128 of the lawn 122, robot 120 may be unable to detect or may receive an insufficiently strong signal from the beacon 124a, which emits a wireless signal 125 that may be blocked or attenuated by a house 126 as the wireless signal 125 travels toward the portion 128. A user may wish to add a new beacon that can emit a wireless signal detectable by robot 120 in the portion 128. Adding the new beacon in the portion 126 to the set of beacons 124a, 124b, 124c paired to robot 120 can improve the accuracy of the estimation of the robot's location in the portion 126.

In the example of FIG. 1A, second robot 102 can be configured such that the second robot 102 does not communicate with beacons with which the second robot 102 is not paired. For example, the second robot 102 can be configured such that the second robot does not communicate with the first beacons 110, which are not paired with the second robot 102. Likewise, first robot 100, which is not paired with the second beacons 112, can be configured such that the first robot 100 does not communicate with the second beacons 112.

The environment 104 also includes a beacon 114 that is not paired with the first robot 100 or the second robot 102. The beacon 114 is in communication range of both robots 100 and 102 (e.g., the robots 100, 102 can detect wideband, ultra-wideband, etc. signals emitted by the beacon 114), and can be paired with either of those robots. For example, first robot 100 can add the beacon 114 to the set of beacons already paired with the robot 100. Beacon 114 can replace an existing beacon or augment the existing beacons to improve localization and navigation of the first robot 100. For example, the robot 100 may be unable to detect signals from three beacons at a location on lawn 106, or the signals from one of the beacons may be weak in that area. Beacon 114 may be added to that area of the lawn and paired to robot 100 to provide the robot 100 with better beacon signals from that area as described above.

As noted herein, robots 100, 102 can include systems that allow the robots to navigate through the environment 104, to perform mowing operations on the lawns 106, 108, and to communicate with devices (e.g., the first beacons 110, the second beacons 112, and the beacon 114), etc. FIGS. 2A-2E depict an example robot. The robot 200 includes drive wheels 202a, 202b drivable by motors (not shown) to maneuver the robot 200 about a surface (e.g. the first lawn 106, the second lawn 108). Caster wheels 204a, 204b and the drive wheels 202a, 202b support a chassis 206 of the robot 200 above the surface. The robot 200 detects contact with obstacles in the environment and determines attributes of that contact, such as a location of the contact with the body of the robot. This object location detection ability allows the robot to automatically select a maneuver, such as a turn, a back up maneuver, etc., to navigate around the obstacle.

Figure 2A:
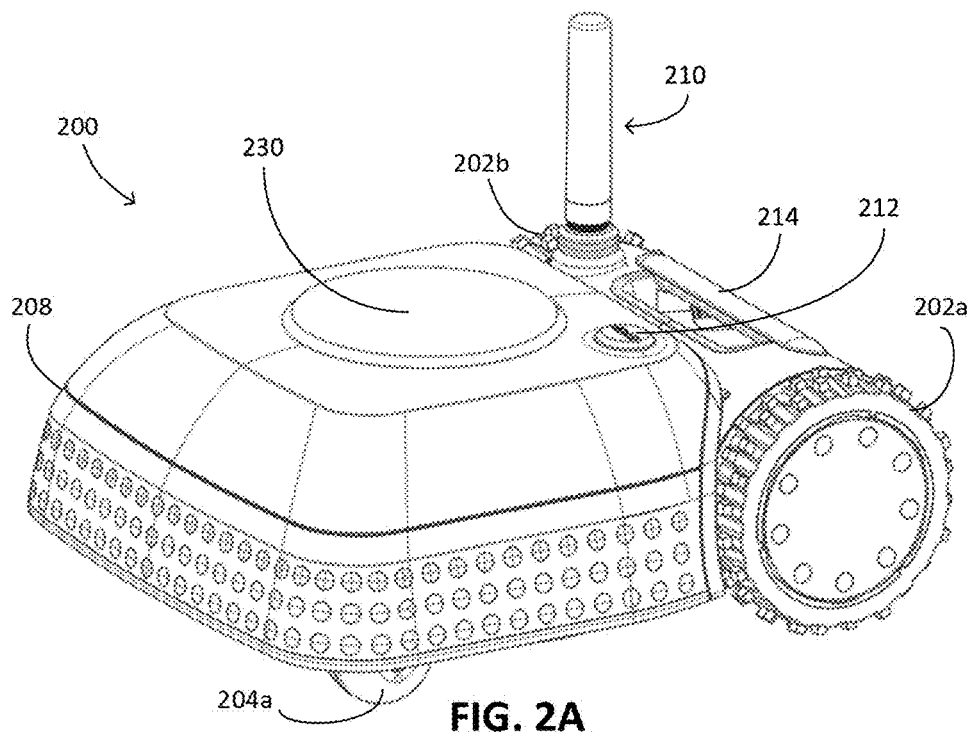
FIG. 2A is an isometric view of a mobile lawn mowing robot including an antenna module.

As viewable in FIG. 2A, the robot 200 includes a shell 208 and an antenna module 210 connected to the chassis 206. On a top surface, the robot 200 has a stop button 212 and a lid 230. Upon the stop button 212 being depressed (e.g. by a user), operations of the robot 200 cease. The lid 230 can be opened to access an internal compartment of the robot 200, which may include an ignition (not shown), etc. The robot 200 also includes a handle 214 disposed on a rear edge, allowing for a user to manually move the robot 200 for various situations including perimeter training, power failure, etc.

Figure 2B:
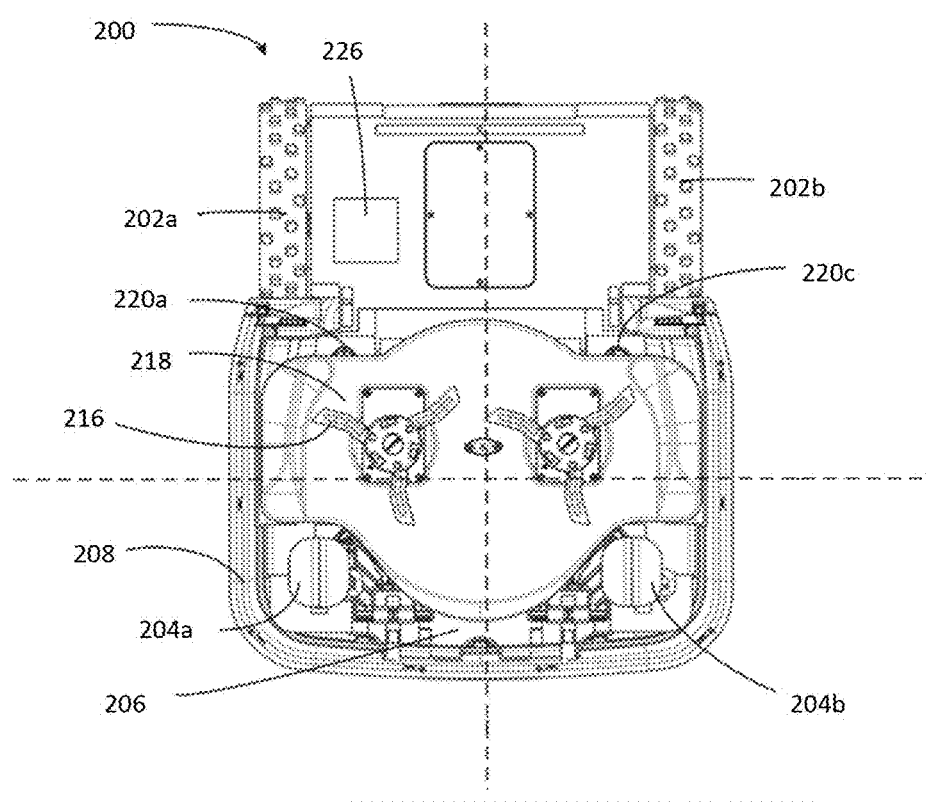
FIG. 2B is a bottom view of a mobile lawn mowing robot.

Referring to FIG. 2B, the robot 200 has cutting blades 216, which are driven by a motor (not shown), for cutting grass. The cutting blades 216 are mounted on a cutting assembly 218 that is connected to the chassis 206 of the robot 200. The shell 208 is connected to the chassis 206 by suspension posts 220a-220d (of which posts 220a and 220c are viewable in FIG. 2B). The suspension posts 220a-220d allow the shell 208 to move both laterally (e.g., horizontally) and axially (e.g., vertically) relative to the chassis 206 of the robot 200.

Figure 2C:
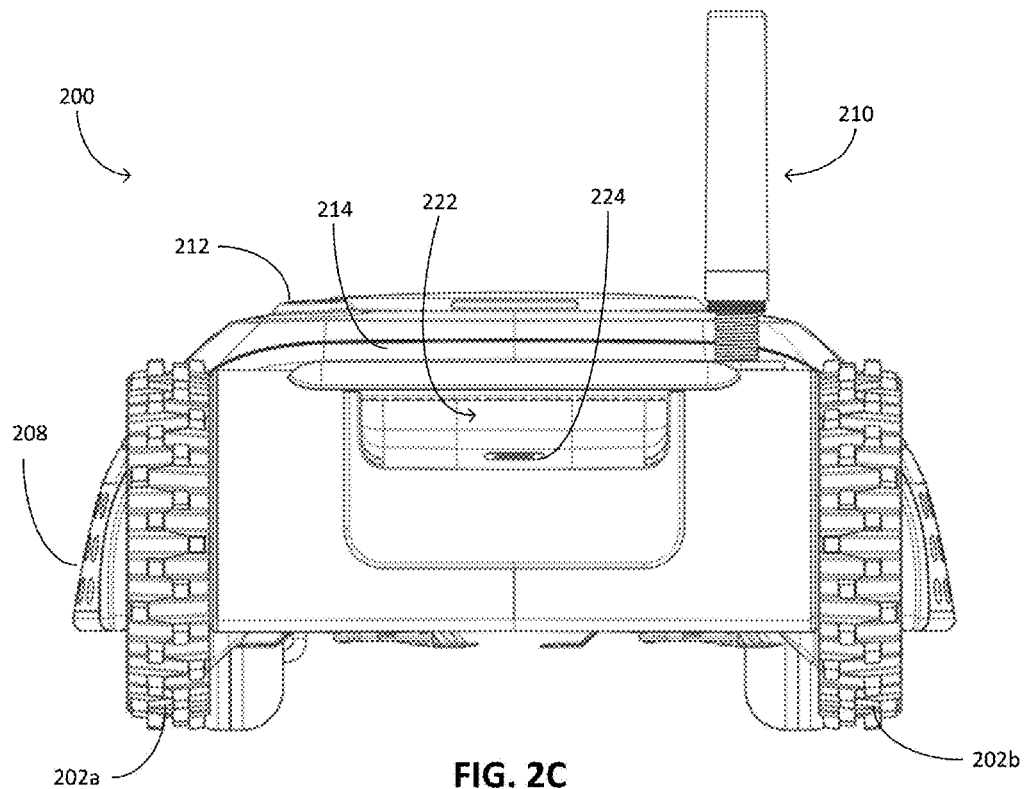
FIG. 2C is a back view of a mobile lawn mowing robot.
Figure 2D:
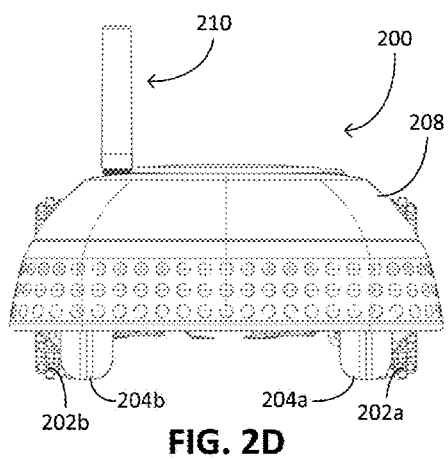
FIG. 2D is a front view of a mobile lawn mowing robot.
Figure 2E:
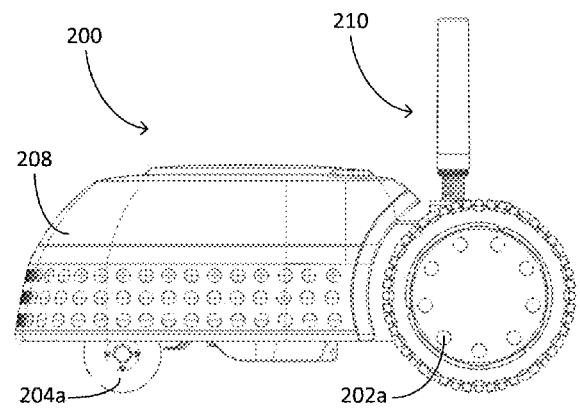
FIG. 2E is a side view of a mobile lawn mowing robot.

Referring to FIG. 2C, the robot 200 further includes a battery container 222 in the aft portion of the robot 200. The battery container 222 can be removed by pulling a handle 224 in order to service, replace, etc. one or more batteries. FIG. 2D depicts a front view of the robot 200. FIG. 2E depicts a side view of the robot 200.

Figure 3:
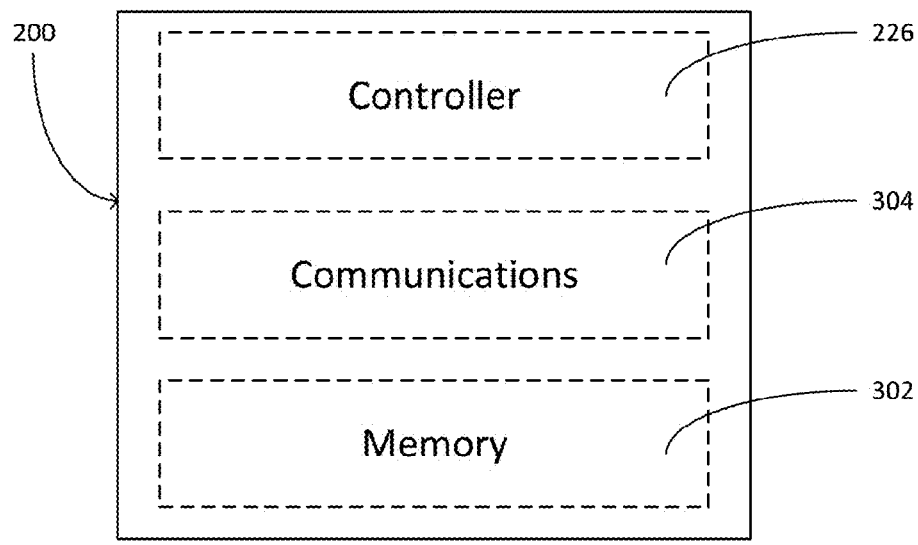
FIG. 3 is a block diagram of computational components of a mobile lawn-mowing robot.

FIG. 3 depicts a block diagram of systems included in the robot 200 to perform the operations described herein. For example in one implementation, the robot 200 includes a controller 226 (e.g., an electronic processor or one or more other appropriate processing devices) that can execute stored instructions to control the navigation, mowing, communication, etc. operations of the robot 200. In some implementations, the controller 226 may be disposed at a single location (e.g., a bottom surface of the robot (shown in FIG. 2B) or distributed among multiple locations. A communications system 304 operable with the controller 226 can include a wireless transceiver—such as, for example, a wideband, ultra-wideband, etc. wireless transceiver—that enables the controller 226 to communicate wirelessly with other devices in the environment, such as the beacons. In some implementations, the communications system 304 includes an antenna module (e.g., the antenna module 210 shown in FIG. 2). Additional aspects of the communications system including its design, mounting, calibration data, and operation are described herein. The robot 200 also includes a memory 302, which is accessible to controller 226, stores information locally on the robot (e.g., executable instructions, collected data, etc.).

Figure 4:
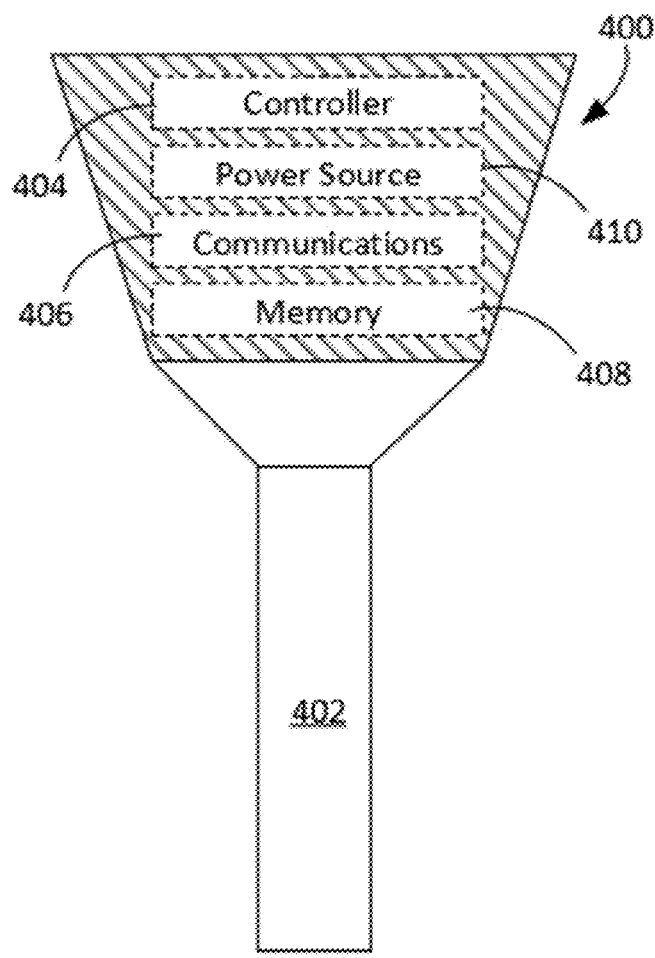
FIG. 4 is a front, cut-away, view of a beacon showing components thereof in block diagram form.

To communicate with devices external to the robot 200 (via the communications system 304), one or more techniques can be employed. For example, the beacons described herein include systems to implement communications and pairing with a robot. FIG. 4 is a schematic front view of an example beacon 400 including appropriate systems to support the communications, pairing operations, etc. The beacon 400 can be attached to a stake 402 that can be placed into a lawn so that the position of the beacon 400 is fixed in the environment. In some implementations, the beacon 400 can include an adhesive that can be affixed in the outdoor environment to already existing structures (e.g., the side of a house, a fence post, or a tree). A controller 404 (e.g., an electronic processor or one or more other appropriate processing devices) of the beacon 400 can control a communications system 406 of the beacon 400. The communications system 406 can include a wireless transceiver that can emit wireless signals, such as wideband, ultra-wideband, etc. signals, into the environment. The communications system 406 can also use the wireless transceiver to receive wireless signals emitted into the environment by, for example, the robot 200.

The controller 404 can control the communications system 406 to emit wireless signals for different purposes and functions. For example, during a pairing operation to pair the robot 200 with the beacon 400, the communications system 406 can be controlled to emit a broadcast that the robot 200 can receive (via the antenna module 210) and be identified to initiate pairing operations with the beacon 400. The communications system 406 can be controlled to transmit a message that the controller 226 of the robot 200 can use to determine a distance between the robot 200 and the beacon 400. During navigation and mowing operations of the robot 200, the beacon 400 can emit wireless signals that the robot 200 receives (again via the antenna module 210) and uses to localize itself within the environment. A memory 408 that is accessible to the controller 404 permits local storage of information.

The beacon 400 can also include additional portions for other functionality, for example, the beacon can include a replaceable power source 410 (e.g., a battery) that provides power to the various beacon systems. The controller 404 can monitor a power level of the power source 410. The communications system 406 can transmit status updates about the power level of the power source 410.

Figure 5:
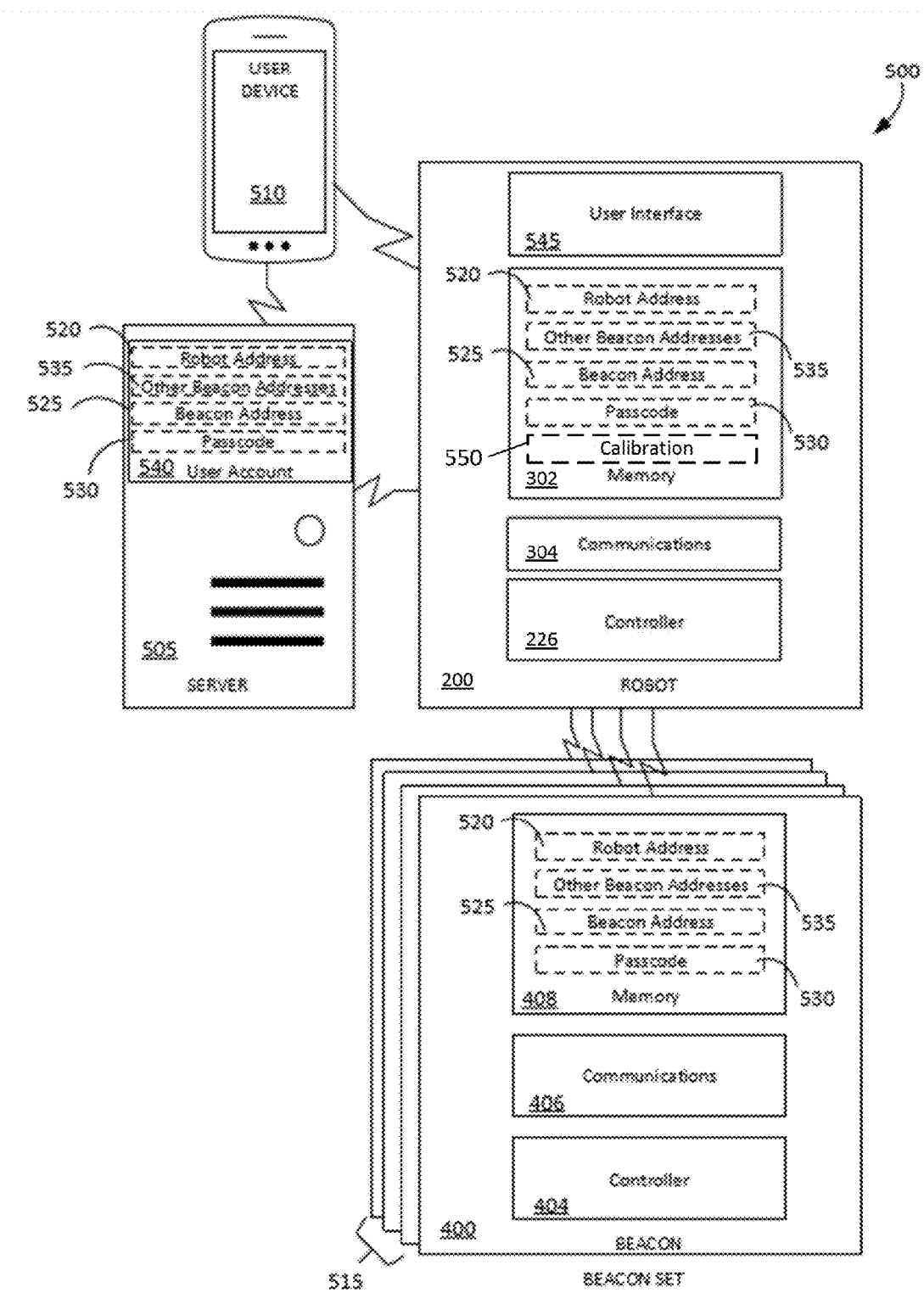
FIG. 5 is a block diagram of a network of devices, including a mobile lawn-mowing robot, a server, a set of beacons, and a user device.

As graphically depicted in FIG. 5, the robot 200 and the beacon 400 can be part of a network 500 of devices. The devices in the network 500 can use one or more wireless protocols, techniques, etc. to communicate with other devices in the network. The communications system 304 (that includes the antenna module 210) of the robot 200 allows the robot to wirelessly communicate with a server 505, a user device 510 (e.g., a mobile device, a smart phone, a computer, etc.), and the beacon 400. The network 500 can also include other beacons 515 paired with the robot 200. The communications system 304 can communicate with the server 505 using, for example, a Wi-Fi transceiver in communication with the antenna module 210. The communications system 304 can also communicate with the communications system 406 of the beacon 400 using wideband, ultra-wideband, etc. signals. Although the network described includes a robot, a beacon set, a server, and a user device, it will be appreciated additional devices may be included in the network by employing one or more communication techniques (e.g., RF communication).

The memory 302 of the Robot 200 and the memory 408 of the beacon 400 can store various information transmitted through the network 500. The memory 302 can store a robot address 520 unique to the robot 200. The robot address 520 is a unique identifier (e.g., a serial number) for the robot 200 that can be sent with wireless signals (e.g., wideband, ultra-wideband signals, etc.) transmitted by the communications system 304 (e.g., using the antenna module 210). The memory 408 of the beacon 400, when the robot 200 is paired with the beacon 400, can also store the robot address 520. By storing the robot address 520, the memory 408 enables the beacon 400 to be uniquely paired to the robot 200.

The memory 408 of the beacon 400 stores a beacon address 525 unique to the beacon 400. Similar to the robot address 520, the beacon address 525 is a unique identifier for the beacon 400. The beacon 400 can transmit the beacon address 525 with wireless transmissions of its communications system 406. When the robot 200 is paired with the beacon 400, the memory 302 can store the beacon address 525. By storing the robot address 520, the memory 408 can enable the beacon 400 to be paired to the robot 200 such that other robots cannot pair to the beacon 400. By storing the beacon address 525, the memory 302 enables the robot 200 to be paired to the beacon 400 such that, during navigation and mowing operations, the robot 200 can communicate with the beacon 400.

The robot 200 and the beacon 400 can also both store a predefined address that is not specific to any beacon or robot. During a pairing operation, the communications system 304 and the communications system 406 can communicate with one another using the predefined address prior to the robot 200 receiving the beacon address 525 and the beacon 400 receiving the robot address 520.

A passcode 530 can be stored in both the memory 302 of the robot 200 and the memory 408 of the beacon 400. To pair the beacon 400 with another robot, the passcode 530 may be entered into, for example, a user interface of the other robot to allow the other robot to pair with the beacon 400.

Other types of data may also be stored on the memory 302, for example, calibration data 550 (e.g., calibration look-up table, functions, etc.) can be stored for later retrieval and application to collected signals. Calibration data 550 can represent various parameters for signal correction, for example, ranging and angular calibration data can be stored and retrieved to account of position offsets (e.g., antenna element spacing), angles (e.g., antenna element orientation), etc. Along with being stored, retrieved, etc. by the communications system 304 and controller 226, the calibration data 550 is presentable on the user interface 545 for inspection, trouble-shooting, etc. Similar to other types of data, the calibration data 550 is transferrable to other components of the network 500 of devices (e.g., provided to the user device 510, server 505, etc.). The calibration data 550 may also be provided to one or more of the paired beacons for storage, comparison with other calibration data, maintenance issues, etc.

The other beacons 515 form part of a set of beacons already paired with the robot 200. For example, these beacons may have been previously paired to the robot by a user or during manufacture of the robot and beacons. The other beacons 515 each include a beacon address. Each of the other beacons 515 includes a memory to store its unique beacon address. The memory 408 can store beacon addresses 535 of the other beacons 515 so that the other beacons are exclusively paired to the robot 200. During the pairing operations, the controller 226 can cause the communications system 304 to propagate the beacon addresses 535 to each of other beacons paired to the robot 200. As a result, the memories of the other beacons 515 and the memory 408 of the beacon 400 can also store the other beacon addresses 535. The memories of the other beacons 515 can also store the passcode 530.

In some implementations, the server 505 can store the robot address 520, the beacon address 525, the passcode 530, and the other beacon addresses 535 in memory storage associated with a user account 540. The robot 200 can communicate the information stored in the user account 540 by communicating with the server 505 using the communications system 304. The information stored in the user account 540 can serve as a backup to storage elsewhere on the network.

To control the operations of the robot 200 (e.g., the pairing, navigation, and mowing operations), the user can interact with the user interface 545. In some implementations, the user interface 545 may include, but is not limited to, the stop button 212, an array of light indicators, and an array of buttons to control the operations of the robot 200, etc. The user device 510 can communicate with the communications system 304 of the robot 200 using, for example, a Bluetooth, a Wi-Fi, etc. connection or may employ one or more other types of electromagnetic communications (e.g., using the antenna module 210, a laser based system, etc.). The user can additionally or alternatively use the user device 510 to view information and enter information pertaining to the operations of the robot 200. The user can invoke the user interface 545 and/or the user device 510 to, for example, confirm various operations associated with pairing the robot 200 with the beacon 400 and enter the passcode 530 to allow for pairing to occur. The user can also use the user interface 545 of the robot 200 or the user device 510 to view and respond to errors and requests transmitted by the communications system 304 of the robot 200.

Figures 6, 7:
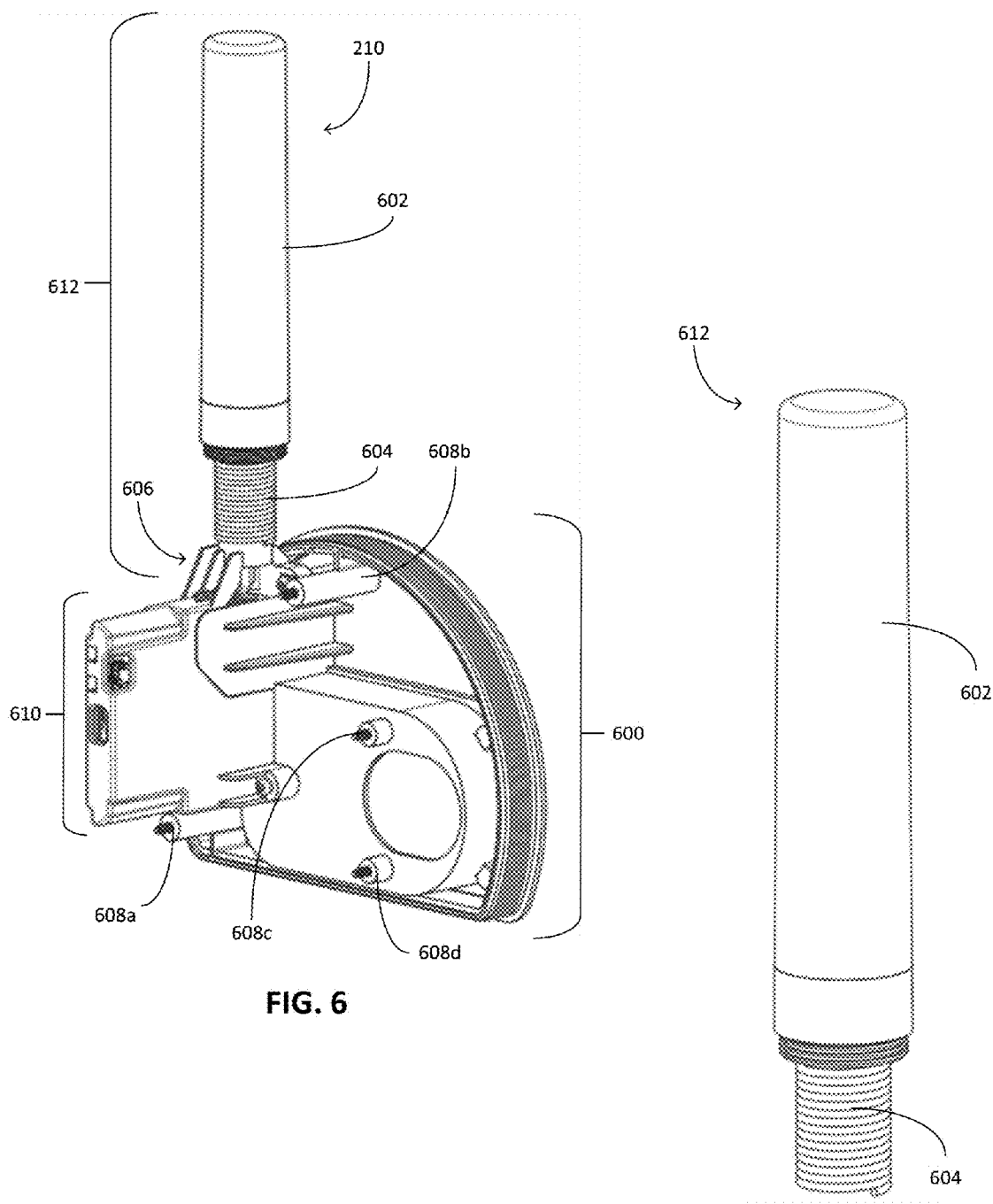
FIG. 6 is an isometric view of an antenna module comprising an antenna assembly and a base assembly.
FIG. 7 is an isometric view of an antenna assembly.
Figures 8, 9:
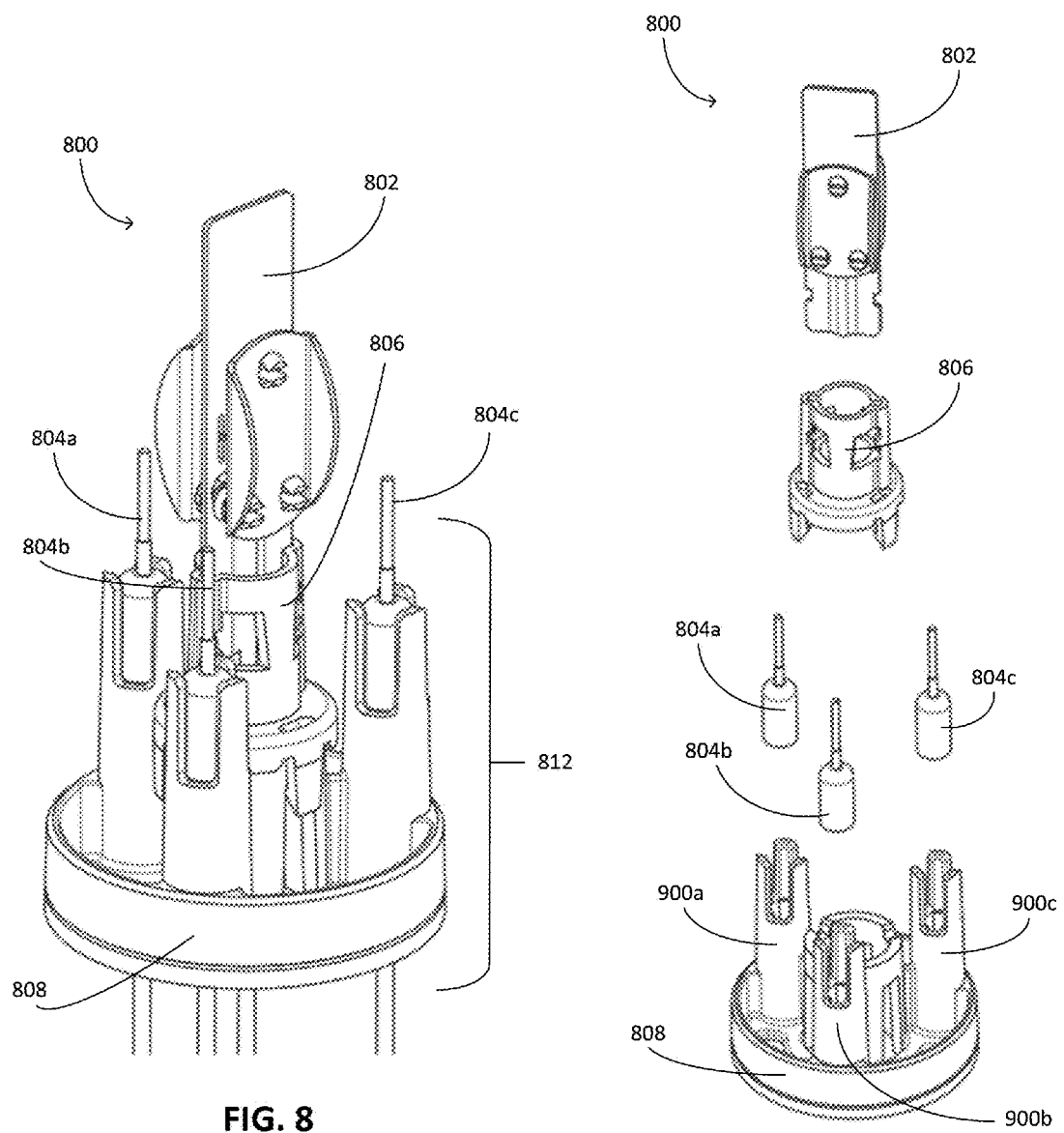

FIGS. 6, 7, 8, and-9 depict physical aspects of the robot communications system 304, in particular the antenna module 210, and functionality provided thereby. As previously described, the communications system 304 enables the controller 226 (shown in FIG. 3) to exchange signals with the various devices on the network 500, which may include the beacon set 515, the server 505, and the user device 510 (as shown in FIG. 5).

Referring to FIG. 6, one implementation of the antenna module 210 (of the communication system 304) is presented and includes an antenna assembly 612 mounted to a base assembly 600. The antenna assembly 612 connects to the base assembly 600 through an interference fit with an array of fins 606 disposed on the base assembly 600. In this implementation, the fins 606 provide support, strength, and reduce complexity for injection-molded tooling. In some implementations, a cable harness or similar mechanism can be inserted through one or more of the fins to assist with support. In addition to affixing the antenna assembly 612 to the base assembly 600, the array of fins 606 serves to mechanically isolate the electronic connections between the antenna assembly 612 and the base assembly 600. One or more materials may be employed to produce the fins (e.g., one or multiple plastics).

The base assembly 600 includes an electronic interface 610, which connects to the controller 226 of the robot 200. The electronic interface 610 enables signal received from the antenna assembly 612 to be provided to the controller 226, and allows the controller 226 to provide signals to the antenna assembly 612 for transmission. The base assembly 600 attaches to a rear portion of the chassis 206 via mounting posts 608a, b, c, d. Such mounting allows the antenna module 210 to be removed from one robot and attached to another robot. Along with transferring its capability from one robot to another, removal of the antenna module 210 may be warranted for other operations (e.g., service module components, perform a calibration operations, etc.).

FIG. 7 presents a view of the antenna assembly 612. A housing 602 protects the internal hardware of the antenna assembly 612 along with providing other functionality (e.g., provides a radome for antenna elements so incident waves and transmitted waves can propagate through the radome material with appropriate levels of reflection and loss). A spring 604 is disposed below the housing 602 and interfaces with the mounting fins 606 of the base assembly 600 (FIG. 6). In general, the spring 604 provides a flexible coupling that allows the assembly 612 to be deflected (e.g., up to 90 degrees in any direction), for example, upon encountering one or more obstacles in the yard that are not detected by a bumper sensor of the robot 200. The spring 604 also provides other functionality such as returning the antenna assembly 612 to a calibrated position with respect to a coordinate system of the robot (e.g., Cartesian coordinate system) upon disengaging with the obstacle(s). Such functionality allows relatively high antenna heights to be realized without considerable impairment to mobility. In some implementations, the spring 604 is coupled to the mounting fins 606 through a threaded interface to reduce the probability of decoupling of the parts. A threaded interface arrangement can cause the coil of the spring to tighten due to the winding direction of the spring; for example, when being unscrewed from the threaded interface. While the mounting fins 606 are employed in this illustrated example, one or more other types of coupling interfaces can be used, independently or in concert with the fins, to secure the antenna assembly 612. In some implementations, the housing 602 may include external component, for example an array of light indicators configured to give visual alerts to a user. One or more components of the robot 200 can be employed for setting antenna height. For example, the spring 604 can be used to position the antenna assembly at a reasonable height for signaling operations (e.g., provide sufficient line of site for communications with beacons and other devices) while not extending to a height that could hinder operations of the robot (e.g., hinder mowing operations by having the antenna assembly 612 getting tangled in low-hanging tree or bush branches). In some implementations, the top of the housing 602 can have a height between 400 mm and 500 mm (e.g., 436 mm) above the surface (e.g., the ground) that the robot 200 is positioned. Dimensions of the housing 602 may also assist in performing such operations, for example, the cylindrical shaped housing can have an outer diameter between 30 mm to 50 mm (e.g., 35 mm). In some arrangements the outer diameter may exceed 50 mm. Characteristics of the spring 604 may also be set to provide operational assistance. For example, the spring 604 can be preloaded to ensure that the antenna assembly 612 does not sway or move during normal operation of the robot 200, but will bend down if a force (larger than the preload) acts upon the spring. In some implementations, the force required to overcome the preload can range between 0.5 N to 2.5 N, for example 1 N.

Referring to FIG. 8, one or more antenna layouts can be employed to achieve design objectives, as illustrated by the components of the antenna assembly 612 shown in the figure. For example, multiple antenna elements may be included the housing 602 for identifying the angle of arrival (AOA) of an incident electromagnetic wave. Further, the antenna elements employed can allow for the three dimensional (3D) AOA to be determined to assist with identifying particular sources (e.g., a paired beacon), ranging to a source, etc. In this particular example (as illustrated in the figure), antenna elements are positioned to form a tetrahedral geometry in which three antenna elements define the base of the tetrahedral and a central antenna element is positioned above the base. As illustrated, a cutaway, isometric view of the antenna assembly 612 reveals a 3D RF Angle of Arrival (AOA) system 800. To assist with viewing the components of the system 800, FIG. 9 provides an exploded view of the 3D RF AOA system 800 included in the antenna assembly 612. In this design, three antenna elements 804a, 804b, and 804c (referred to as angle antennas) provide the base of the tetrahedral and are axisymmetrically position around another antenna element 802 (referred to as the ranging antenna), which is positioned above the triangular base of antenna elements 804a, 804b, and 804c. In this arrangement the three antenna elements 804a, 804b, and 804c are used to receive signals to determine AOA while the ranging antenna element 802 is used to determine range. Employing such a tetrahedral geometry with four antenna elements removes ambiguity in determining the angle of arrival of an incident wave (which can be experienced when using less antenna elements such as a two-element system). In some implementations the top of the ranging antenna 802 can have an approximate height between 375 mm and 475 mm (e.g., 413 mm) above the surface that the robot is positioned. The height of each of the three angle antennas 804a, 804b, and 804c can be between 360 mm and 460 mm (e.g., 396 mm).

In this implementation, the 3D RF AOA system 800 includes a holder 812 comprising an upper portion 806 and a lower portion 808. The upper portion 806 of the holder 812 is designed to hold the main antenna 802. As shown in FIG. 9, the geometry of the upper portion 806 allows the main antenna 802 to be installed by snapping the main antenna into place. In this arrangement, the main antenna 802 employs a rectangular slot antenna design and the holder 812 is produced from plastic, however, other materials or combinations of materials may be used to produce the components of the 3D RF AOA system. In some implementations, acrylic-styrene-acrylonitrile (ASA) polymers or other types of amorphous plastics are employable for producing the structures of the 3D RF AOA system, the antenna assembly 612, the base assembly 600, etc. One or more portions of the housing 602 (e.g., a radome portion of the housing), the upper portion 806 of the holder 812, the lower portion 808 of the holder 812, etc. can include a thin-walled polypropylene or one or more other materials that have properties for appropriate electromagnetic wave propagation.

The lower portion of the holder 808 holds the three angle antennas 804a-804c in place. In one arrangement, each angle antenna is held in place by a respective plastic finger 900a-900c, each positioned to form the base of the tetrahedral geometry and oriented to reduce blocking the reception of the other antenna elements, reduce incident wave reflections, etc. For example, a reduced amount of materials (plastics) can be used to produce the portions of the holder 812 (e.g., thickness of the fingers 900a-c) to reduce incident wave reflections. Materials can be selected for attempting to match free space impedance (e.g., select materials with appropriate permeability and permittivity) to reduce reflections and thereby reduce system measurement error.

As illustrated, the three angle antennas 804a-804c are axisymmetrically arranged around the ranging antenna 802 to form a tetrahedral shape with the vertices of the tetrahedron defined by the tip of each antenna. The separation distance between each of the four antennas 802, 804a-804c is chosen to be less than one half wavelength of the communication system operating frequency. For example, in some implementations, an equal distance separates each pair of antenna elements. Using a separation distance between 0.5 and 1.5 cm corresponds to operating frequencies between 10 and 30 GHz, however, other separation distances may be used for operating frequencies in high or lower radio communication bands (e.g., 6.5 GHz, between 5925 MHz and 7250 MHz, etc.). While some implementations can used unequal separation distances between the antenna elements, typically one common separation distance is used to define the tetrahedral geometry. Setting the antenna separation distance to be less than one half wavelength also allows phase differences (measured at two antenna elements) to be determined without phase wraparound. For systems that employ techniques to account for wraparound of measured phases, antenna separation may be increased to distances larger than one half wavelength. This element tetrahedral geometry removes the directional ambiguity by measuring incident waves with four antenna elements rather than two elements. Once measured, techniques such as time difference of arrival (TDOA), phase difference of arrival (PDOA), etc. can be executed individually or in combination to determine the angle of arrival of the incident wave absent ambiguity.

In some arrangements, additional information can be collected to determine the orientation of the tetrahedron geometry of the antenna elements relative to other geometries. For example, the orientation of the AOA system 800 relative to the geometry of the beacons can be determined from a range measure between the AOA system 800 and one or more beacons. With the range(s) determined, a location of the AOA system 800 based on the location(s) of the beacon(s) can be determined. One or more techniques may be employed to determine such a range; for example, circuitry (e.g., a DW1000 low power single chip radio transceiver from DecaWave of Dublin, Ireland) may be incorporated into the communications system 304 of robot 200, one or more beacons, etc. By transmitting data packets between devices (e.g., the robot 200 and the beacon 400), the range between the devices can be determined. In some arrangements, a DW1000 chip is incorporated into each antenna module (e.g., a DW1000 chip is incorporated for each of the antenna elements 802, 804a-804c, for a total of four DW1000 ICs). Provided the angle of arrival information (e.g., from the phase difference of arrival for the four antenna elements 802, 804a-804c) and the range information, a distinct orientation of the tetrahedron configuration can be determined in 3D space with reference to the location of a transmitting node (for example, the beacon 400).

The 3D RF AOA system 800 enables the robot 200 to receive and transmit wireless signals in one or more frequency bands (e.g., high frequency (HF), very high frequency (VHF), extremely high frequency (EHF), etc.), use one or more radio technology techniques (e.g., wide band, ultra-wideband, etc.), protocols (e.g., wireless protocols such as Wi-Fi, Bluetooth, etc.), etc. The wide range of devices the 3D RF AOA system 800 can communicate with allows for a wide range of applications. For example, the robot 200 is able to receive and transmit signals to communicate with a beacon (e.g., beacon 400) or a set of beacons (e.g., beacons 515) in order to pair the robot 200 and the one or more beacons, thereby creating an exclusive interaction between the paired devices. The robot 200 is able to receive and transmit signals to communicate with one or more beacons to determine the location of the robot 200. For example, upon receiving a signal from the beacon 400, the 3D RF AOA system 800 is able to uniquely solve for the location of the robot 200 in 3D space in reference to the transmitting beacon. The accuracy of the calculated location can be improved through performing similar operations with a set of beacons (e.g., beacon set 515) arranged throughout a mowable surface.

In some arrangements, location determination of the robot 200 can include using information from a movement sensor that generates movement signals indicative of a distance travelled by the robot, a speed of the robot, an acceleration of the robot, etc. A movement sensor can also detect relative rotations around one or more axes (e.g., an inertial measurement unit (IMU)). In some arrangements, the controller 226 can use the movement signals to perform Simultaneous Localization and Mapping (SLAM) techniques that the robot 200 can use, in addition to the beacon-based localization techniques, to estimate its position within the environment. Based on the movement signals and/or other collected information (e.g., from one or more beacons), the controller 226 can generate a map of the environment and determine the pose of the robot. The movement signals can include data from, for example, encoders associated with a drive of the robot, an optical mouse sensor, an IMU, an accelerometer, a gyroscope disposed on the robot, etc. The data of the movement signals can be used as dead reckoning data that the controller 226 uses to determine relative positions of the robot. Thus, as the robot 200 navigates about the environment, the controller 226, using the movement signals, can determine a relative position of the robot 200 measured relative to previous positions of the robot. Accurate over relatively short distances, dead reckoning can be prone to drift errors that accumulate over time. Accumulated drift can affect both the distance computations and the heading computations.

Mounted the with antenna module 210, the robot 200 can provide other types of functionality, for example, the module could include a GPS receiver for robot communicating (e.g., with radio frequency signals) to communicate with a GPS satellite network for determining the global position of the robot. Once attained, the GPS information can be used to determine the global position of the robot in addition to its relative position on a mowable surface. Along with position information, wireless signals can be used for transmitting and receiving other types of information. For example, the robot 200 can use the antenna module 210 to send status information, maintenance alerts, etc. Similarly the robot 200 can wirelessly receive information from one or more beacons regarding beacon status (e.g., battery life), maintenance alert, etc. Communications with the robot 200, via the antenna module 210, can also include one or more computing devices (e.g., servers, mobile devices, computer systems, etc.) for exchanging information. For example, information can be exchanged between the robot 200 and the server 505 (shown in FIG. 5) regarding the user account 540, etc. Various types of information may be transmitted, for example, images, video, audio, etc., can be collected and exchanged among devices (e.g., the robot 200, the server 505, the beacons, other computing devices, etc.). One or more commands, instructional data, etc. may be exchanged between a computing device (e.g., the user device 510 shown in FIG. 5) and the robot 200. One or more network architectures and network devices may establish communications with the robot 200; for example, the robot 200 can receive and transmit RF signals to communicate with a variety of objects connected to the Internet of Things (IoT). The robot 200 can communicate with the IoT such that robot operations are halted if an individual (e.g., a child) is in the vicinity, the robot 200 can communicate with IoT to coordinate operations with a sprinkler system, etc. In another architecture example, the robot 200 can receive and transmit RF signals to communicate with other robots (e.g. robot 100 or robot 102). By establishing such communications, multiple robots can be coordinated to perform mowing operations on a shared mowable surface. Other network based applications can also be initiated by establishing such communications, for example, a network (e.g., a mesh network) can be established among the multiple robots to exchange data among the robots, other devices connected to the network, etc.

Figure 10A:
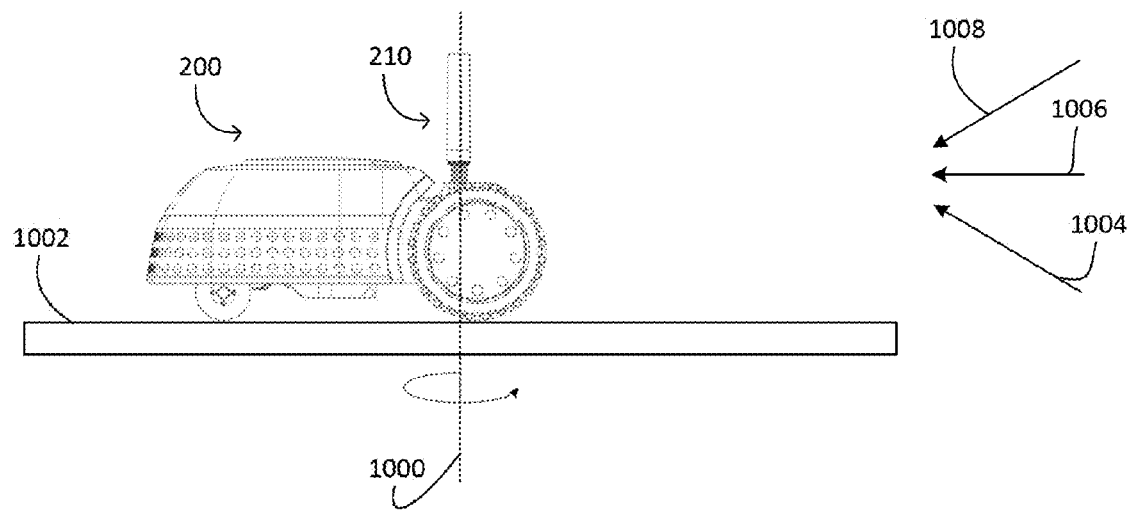
FIGS. 10A and B present calibration layouts for an antenna assembly.
Figure 10B:
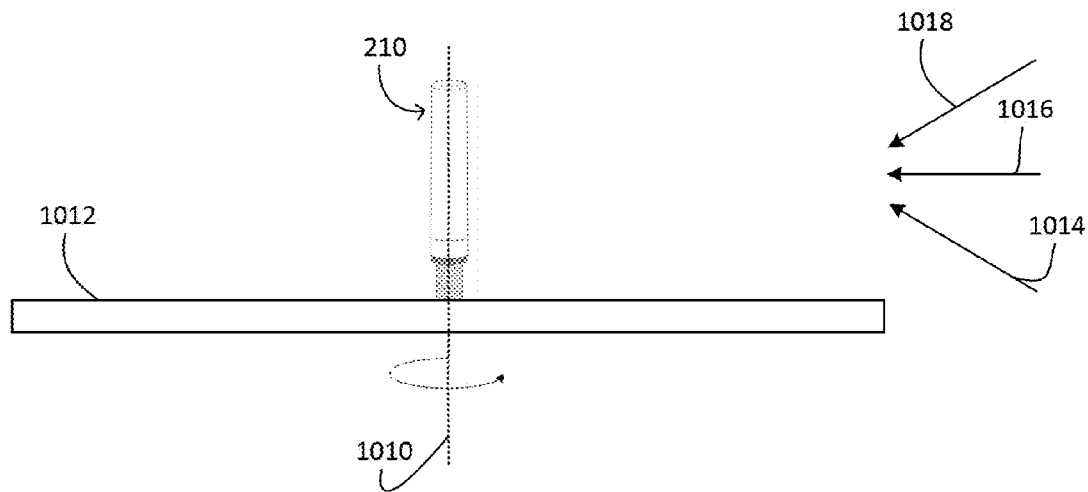

Referring to FIGS. 10A and 10B, the 3D RF AOA system can be calibrated to accurately output a calculated position of the robot 200 relative to one or more transmitting nodes (e.g. beacon 400). For example, techniques may be employed for calibrating AOA measurements to accurate provide azimuth and elevation angles. One or more set-ups may be employed to calibrate the system; for example, a radio frequency source can transmit calibration signals towards the antenna module 210 as the source travels along a circular path at the center of which the antenna module is positioned. For another layout, as illustrated in the both FIGS. 10A and 10B, a radio frequency source is positioned in a stationary location (e.g., e.g., in a compact range, an anechoic chamber, etc.) and the antenna module 210 is rotated about an axis to present each aspect to the source. In FIG. 10A, the antenna module 210 is mounted to the robot 200 and is rotated (clockwise or counter-clockwise) about an axis 1000. A turntable 1002 rotates to present the different aspects of the antenna module 210, which is centered on the axis 1000 so each azimuthal aspect of the antenna module is present at the same distance from the radio frequency source. As illustrated, the radio frequency source can adjusted so incident signals are transmitted at different elevation angle (e.g., signal 1004 is presented at a positive elevation angle, signal 1006 is presented with zero elevation angle, signal 1008 is presented with a negative elevation angle). During the calibration process, signals with different elevation angles can be transmitted towards the antenna module 210 to collect different data sets for calibrating the 3D RF AOA system. Referring to FIG. 10B, in another set-up the antenna module 210 can be calibrated absent the robot 200. In a similar manner, the antenna module 210 is rotated about an axis 1010 (e.g., counter-clockwise) by a turntable 1012 to azimuthally present different aspects to a radio source that transmits signals at a particular elevation angle (e.g., a positive elevation angle signal 1014, a zero elevation angle signal 1016, a negative elevation angle signal 1018).

Various techniques can be employed for calibrating the 3D AOA system, for example, a collection of three techniques may be utilized. For example, one calibration technique can be employed to address less than optimal positioning for the antenna elements contained in the antenna module. Along with this calibration, two techniques can be employed to address distortion; a first distortion correction technique (referred to as input correction) applies calibration values from the initial calibration technique (regarding antenna element positioning) to measured data. A second distortion correction technique (referred to as output correction) accounts for differences between expected phase values (to be received from the radio frequency source signals) and the measured phase values.

For the first calibration technique, the phase difference between a pair of antenna elements (e.g., the ranging antenna 802 and the angle antenna 804a, the angle antenna 804b and angle antenna 804c, etc.) can be measured as the antenna module 201 is rotated about the turntable 1010). In an idea case, the measured phase difference between these two elements should be a sine wave. However, due to positioning error (e.g., during manufacturing of the antenna module 210), the measured phase difference can differ from the expected (or ideal) phase difference. For example, amplitude differences (between the sine waves representing measured and expected phase differences) represents an error in distance between the two antenna elements. A phase difference (again between the sine waves representing the measured and expected phase differences) represents an error in angle between the two antenna elements. An offset between the two sine waves represents an error in the height difference in the two antenna elements. Additionally, a non-zero average of the measured phase difference between the pair of antenna elements represents an offset in the phase difference of arrival of the signals. Such calibration quantities can be determined for incident signals transmitted for different elevation angles. For example, along with determining the calibration quantities for a zero-elevation angle signal (e.g., signal 1016), calibration quantities can be determined for one or more signals with positive elevation angle signals (e.g., signal 1014) and for negative elevation angle signals (e.g., signal 1018). In some arrangements, interpolation techniques can be employed to attain calibration quantities for elevation angles that are not included in the measurements.

By identifying these differences between the expected and measured, quantities can be determined to apply to signals received at the antenna module when mounted to the robot under operation. Such corrections applied to signals collected during robot operations are referred to as distortion correction techniques. In this implementation, two distortion techniques are employed, a first referred to as an input distortion correction technique and a second referred to as an output distortion correction technique. For the first, the output distortion correction technique, phase difference of arrival (pdoa) signals are measured from one or more pairs of antenna elements in the antenna module 210. An inverse map is created from interpolated ground truth data, and the map is used to provide corrected azimuth and elevation. For the second, the input distortion correction technique, a map is created for translating ideal pdoa signals to measured pdoa signals. An inverse map is created for mapping from pdoa signals to ideal pdoa signals. Once created, the inverse map is stored and later retrieved to map pdoa signals (measured during robot operation) to the ideal pdoa signals. From this mapping, azimuth and elevation angles are calculated and returned.

Given the tetrahedral geometry of the 3D RF AOA system 800, the phase difference of arrival between the three angle antennas 804a-804c to the ranging antenna 802 provides both azimuth and elevation angles of the incoming signal. If the transmitter orbits the axis of the ranging antenna 802, or if the 3D RF AOA system 800 is rotated around this axis, the ideal response in the phase difference of arrival (pdoa) is a sine wave. The real response is only an approximation of a sine wave, and the process of calibrating the 3D RF AOA system 800 involves mapping the real response to the ideal response in order to output an accurate azimuth and elevation of the incoming signal.

Figure 11:
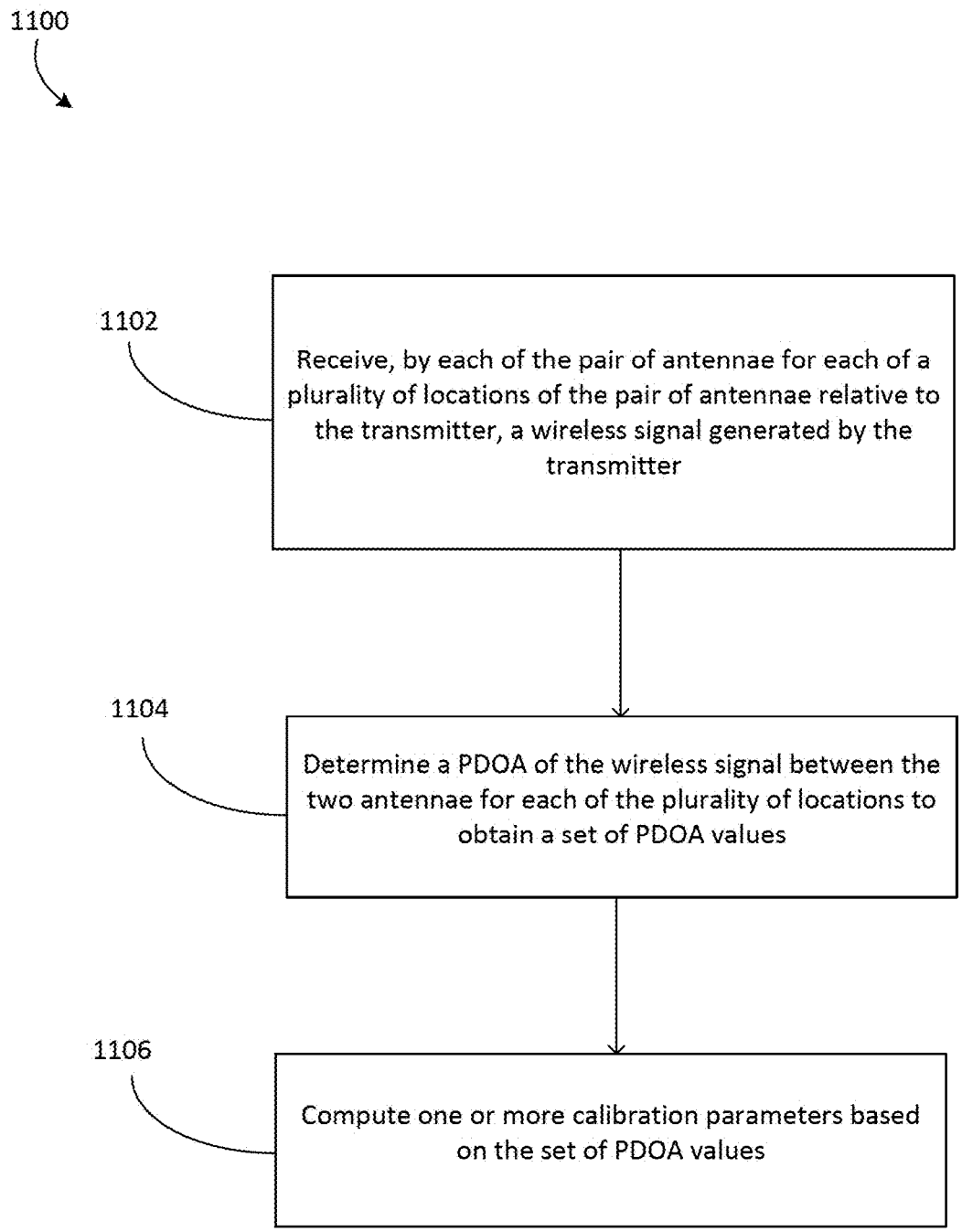
FIG. 11 is a flowchart describing operations of an antenna assembly calibration process.

FIG. 11 is a flowchart of an example process 1100 for computing one or more calibration parameters associated with a pair of antennas disposed on a mobile robot. In some implementations, at least a portion of the process 1100 can be executed at the antenna module 210 described above. For example, the operations of the process 1100 can be executed for each pair of antennas in the antenna module 210 (e.g., a pair including the ranging antenna 802 and one of the angle antenna 804a-804c, a pair including two of the angle antenna 804a-804c, etc.). Operations of the process 1100 includes receiving, by each of the pair of antennas for each of a plurality of locations of the pair of antennas relative to a transmitter, a wireless signal generated by the transmitter (1102). In some implementations, the pair of antennas can be kept static, and the transmitter can be moved to a plurality of locations at various azimuth angles with respect to the antenna array. In some implementations, the transmitter can be kept static, and the pair of antennas can be rotated (e.g., relative to one another) to obtain the plurality of locations of the pair of antennas relative to the transmitter.

Operations of the process also includes determining, a phase difference of arrival (PDOA) of the wireless signal between the two antennas for each of the plurality of locations to obtain a set of PDOA values (1104). In some implementations, the pair of antennas (which may also be referred to as an antenna array) is rotated with respect to a fixed transmitter to multiple locations at a fixed elevation angle (e.g., substantially zero elevation), and the PDOA values for each of the locations are collected to obtain the set of PDOA values. In some implementations, the expected variation of the PDOA values, as the pair of antennas or the transmitter moves in a substantially circular path relative to one another can be represented by a periodic signal such as a sine wave.

Operations of the process 1100 also includes computing the one or more calibration parameters based on the set of PDOA values (1106). For example, if the set of PDOA values are expected to vary in a sinusoidal pattern, the obtained PDOA values are fit to a sine wave, which is then used to find the calibration parameters. For example, an average or mean of the set of PDOA values may represent the reference level of a sine wave, and therefore represent an offset associated with the set of PDOA values.

The one or more calibration parameters can be of various types. In some implementations, one or more calibration parameters can include a distance offset between the two antennas in the pair along a plane on which the antennas are disposed. In such cases, the distance offset may be computed based on an amplitude of the function that represents the set of PDOA values. In some implementations, calibration parameters can account for an angle offset between the two antennas in the pair along a plane on which the antennas are disposed. In such cases, the angle offset may be computed based on a phase of a function that represents the set of PDOA values. For example, if the set of PDOA values is represented as a sine wave, the amplitude of the sine wave can be proportional to the distance between the antennas in the x-y plane, and the phase of the sine wave gives the relative angle of antennas in the x-y plane.

In some implementations, the one or more calibration parameters include a vertical offset between the two antennas. For example, the vertical offset can be the distance between the two antennas in the pair along a direction perpendicular to the plane on which the antennas are disposed. This can be calculated, for example, by rotating the pair of antenna and transmitter relative to one another at a non-zero elevation, and obtaining the PDOA values for the corresponding plurality of locations. The vertical offset can then be calculated by comparing the vertical shift between the function representing the PDOA values at the non-zero elevation, and the function representing the PDOA values at the zero elevation. For example, if the functions representing the PDOA values at the two elevation angles are sine waves, the vertical shift between sine waves can represent the vertical offset (or the distance in the z direction) between the two antennas. In some implementations, the distance offset, angle offset, and the vertical offset between the antennas can be represented using Cartesian coordinates x, y, and z, respectively.

In some cases, due to non-ideal behavior in the PDOA response, the calibration outputs may be affected by distortions inherent in the system. For example, such distortions can be introduced in the wireless signal as the signal travels the medium between the transmitter and the antennas. Such distortions may cause the PDOA variations to deviate from the expected pattern, and/or have undesirable statistical qualities such as zero mean. In some cases, such distortions may be corrected using one or more pre-computed correction parameters that are determined, for example, by comparing a particular set of PDOA responses to a ground truth or ideal response that may be available for the medium. In some implementations, the distortion correction is performed on the calculated calibration parameters. In such a process, which is also referred to as output distortion calibration, the calibration parameters corresponding to the azimuth and elevation are calculated from PDOA values as described above, and the calculated calibration parameters are then corrected for distortions using, for example, a look-up table, correction map, etc.

In some implementations, the correction map can be generated by measuring PDOA data under a controlled setting (e.g., by rotating an antenna array over a 360 degree range of azimuth angles), interpolating available ground truth data to smooth out the distribution of the measured PDOA data, and mapping the ground truth to the measured PDOA. An inverse map can then be created by mapping the measured PDOA to ground truth. This can then be stored as a look-up table, correction map, etc. for use in correcting calibration parameters during run time.

In some implementations, the distortion correction is performed on the PDOA values prior to using the PDOA values for calculating the calibration parameters. In this process, which is also referred to as input distortion calibration, corrected PDOA values are generated using correction parameters pre-computed using ground truth data on PDOA values. The correction parameters can be stored, for example, in the form of a look-up table or correction map. In some implementations, such a correction map can be generated by measuring PDOA data under a controlled setting (e.g., by rotating an antenna array over a 360 degree range of azimuth angles), interpolating the available ground truth data to smooth out the distribution of the measured PDOA data, and mapping the ideal PDOA data to the measured PDOA data. An inverse correction map can then be created by mapping the measured PDOA data to the ideal PDOA data. Such an inverse map can be stored as a look-up table, and used for looking up a corrected PDOA value corresponding to a measured PDOA value. The calibration parameters for the azimuth and elevation angles can then be calculated using the corrected PDOA value.

The examples described herein can be implemented in a variety of ways without departing from the scope of the specification. While a single robot has been described to pair with a set of beacons, the robot can also be configured to pair with multiple sets of beacons. In such cases, the robot can maintain multiple different lawns. Each lawn may contain a different set of beacons which will also have a different map associated with it. The user may select one of the stored maps to use during a mowing operation such that the user can select between the various sets of beacons paired with the robot.

While not shown in FIG. 2, the robot 200 can include a user interface 545 that can receive user interface data from the controller 226 to display information pertaining to the operations of the robot 200. Therefore, the user, in addition or as an alternative to using the user device 510, can view the information on a user interface 545 of the robot 200 and can interact with the user interface 545 to control operations of the robot 200. For example, the user can use the user interface 545 to confirm the pairing between the robot 200 and the beacon 400.

A set of beacons can include three or more beacons, as described in some implementations herein. In some cases, the set of beacons can include fewer than three beacons. The robot can navigate using the signals emitted from the set of beacons including fewer than three beacons and can use on-board movement sensors to also execute dead reckoning processes to improve accuracy of its estimate of its location.

The robots described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment.

Operations associated with controlling the robots described herein can be performed by one or more programmable processors executing one or more computer programs to perform the functions described herein. Control over all or part of the robots described herein can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:
1. A mobile robot comprising:
a chassis;
a shell moveably mounted on the chassis;
a cutting assembly mounted to the chassis; and
a communication system comprising:
an antenna module disposed on a rear portion of the mobile robot, the antenna module comprising:
a base assembly; and
an antenna assembly mounted to the base assembly by a spring, the antenna assembly comprising:
a ranging antenna; and
at least three angle antennas arranged axisymmetrically about the ranging antenna, such that the ranging antenna and the at least three angle antennas define a tetrahedral geometry for determining an angle of arrival for one or more incident signals.

2. The mobile robot of claim 1, wherein each pair of the at least three angle antennas is separated by less than one half wavelength of the one or more incident signals.

3. The mobile robot of claim 1, wherein the ranging antenna and each of the at least three angle antennas is separated by less than one half wavelength of the one or more incident signals.

4. The mobile robot of claim 1, wherein a top of the antenna assembly is positioned at a height of at least 400 mm.

5. The mobile robot of claim 1, wherein the spring is preloaded.

6. The mobile robot of claim 1, wherein the one or more incident signals have a frequency between 5925 MHz and 7250 MHz.

7. The mobile robot of claim 1, wherein the angle of arrival is calibrated using parameters determined from the ranging antenna and the at least three angle antennas.

8. A system comprising:
a network of devices; and
a mobile robot, comprising:
a chassis;
a shell moveably mounted on the chassis;
a cutting assembly mounted to the chassis; and
a communication system comprising:
an antenna module disposed on a rear portion of the mobile robot, the antenna module comprising:
a base assembly; and
an antenna assembly mounted to the base assembly by a spring, the antenna assembly comprising:
a ranging antenna; and
at least three angle antennas arranged axisymmetrically about the ranging antenna, such that the ranging antenna and the at least three angle antennas define a tetrahedral geometry for determining an angle of arrival for one or more incident signals.

9. The system of claim 8, wherein the network of devices comprises at least one of a beacon, a set of beacons, a server, and a user device.

10. The system of claim 8, wherein the one or more incident signals have a frequency between 5925 MHz and 7250 MHz.

11. The system of claim 8, wherein each pair of two of the at least three angle antennas is separated by less than one half wavelength of the one or more incident signals.

12. The system of claim 8, wherein the ranging antenna and each of the at least three angle antennas is separated by less than one half wavelength of the one or more incident signals.

13. The system of claim 8, wherein a top of the antenna assembly is positioned at a height of at least 400 mm.

14. The system of claim 8, wherein the spring is preloaded.

15. The system of claim 8, wherein the angle of arrival is calibrated using parameters determined from the ranging antenna and the at least three angle antennas.

16. The system of claim 8, wherein a separation distance between each pair of the at least three angle antennas is between 0.5 and 1.5 centimeters.

17. The system of claim 8, wherein the at least three angle antennas form a base of the tetrahedral geometry.

18. The system of claim 8, wherein the ranging antenna is configured to measure a distance between the mobile robot and a device of the network of devices.

19. The system of claim 8, wherein the antenna assembly comprises a housing containing the ranging antenna and the at least three angle antennas, and the spring is disposed below the housing of the antenna assembly.

20. The system of claim 8, wherein the antenna assembly comprises a light indicator to provide an alert to a user.

* * * * *